(12) United States Patent
Ishimaru et al.

(10) Patent No.: US 10,553,840 B2
(45) Date of Patent: Feb. 4, 2020

(54) MANUFACTURING METHOD AND MANUFACTURING DEVICE FOR BATTERY PACK

(71) Applicant: Nissan Motor Co., Ltd., Yokohama-shi, Kanagawa (JP)

(72) Inventors: Shoutaro Ishimaru, Kanagawa (JP); Yuta Motohashi, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 15/765,507

(22) PCT Filed: Oct. 13, 2016

(86) PCT No.: PCT/JP2016/080427
§ 371 (c)(1),
(2) Date: Apr. 3, 2018

(87) PCT Pub. No.: WO2017/069045
PCT Pub. Date: Apr. 27, 2017

(65) Prior Publication Data
US 2019/0074490 A1 Mar. 7, 2019

(30) Foreign Application Priority Data
Oct. 22, 2015 (WO) ................. PCT/JP2015/079902

(51) Int. Cl.
*H01M 10/052* (2010.01)
*H01M 2/10* (2006.01)
(Continued)

(52) U.S. Cl.
CPC ............ *H01M 2/1016* (2013.01); *H01M 2/10* (2013.01); *H01M 2/1061* (2013.01); *H01M 2/20* (2013.01);
(Continued)

(58) Field of Classification Search
CPC ......................... H01M 10/052; H01M 10/0525
See application file for complete search history.

(56) References Cited

U.S. PATENT DOCUMENTS 9,685,648 B2   6/2017  Kitagawa et al.
9,741,984 B2   8/2017  Lee et al.
(Continued)

FOREIGN PATENT DOCUMENTS

CN   1988215 A    6/2007
CN   102308433 A  1/2012
(Continued)

*Primary Examiner* — Olatunji A Godo
(74) *Attorney, Agent, or Firm* — Global IP Counselors, LLP

(57) ABSTRACT

A manufacturing method of manufacturing a battery pack that includes: a cell group obtained by stacking unit cells in a stacking direction, and a bus bar electrically connecting the unit cells. Each of the unit cells has a cell body, an electrode tab and a spacer. The electrode tabs protrude out from the cell bodies, and are supported by the spacers. The method includes positioning joining portions of the electrode tabs to the bus bar at predetermined positions in a movement direction of the spacers by moving the spacers in one direction in a state in which the unit cells and the spacers are stacked, before the bus bar is joined to the electrode tabs. In addition, the method includes joining the bus bar to the electrode tabs in a state in which the joining portions of the electrode tabs are positioned at the predetermined positions.

13 Claims, 17 Drawing Sheets

(51) Int. Cl.
*H01M 2/34* (2006.01)
*H01M 2/20* (2006.01)
*H01M 2/26* (2006.01)
*H01M 2/30* (2006.01)
*H01M 10/04* (2006.01)
*B23K 26/24* (2014.01)

(52) U.S. Cl.
CPC ........... *H01M 2/202* (2013.01); *H01M 2/263* (2013.01); *H01M 2/30* (2013.01); *H01M 2/34* (2013.01); *H01M 10/0404* (2013.01); *B23K 26/24* (2013.01)

(56) References Cited

U.S. PATENT DOCUMENTS

| | | | |
|---|---|---|---|
| 9,865,849 B2 | 1/2018 | Kayano et al. | |
| 2007/0141457 A1* | 6/2007 | Amagai | H01M 2/021 429/152 |
| 2008/0124617 A1 | 5/2008 | Bjork | |
| 2016/0072166 A1 | 3/2016 | Park et al. | |

FOREIGN PATENT DOCUMENTS

| | | |
|---|---|---|
| CN | 202839792 U | 3/2013 |
| CN | 103151550 A | 6/2013 |
| CN | 103828089 A | 5/2014 |
| JP | 2007-42578 A | 2/2007 |
| JP | 2007-172893 A | 7/2007 |
| JP | 2009-231267 A | 10/2009 |
| JP | 2010-212165 A | 9/2010 |
| JP | 2012-515418 A | 7/2012 |
| JP | 2013-206772 A | 10/2013 |
| JP | 2014-110219 A | 6/2014 |
| JP | 2014-135162 A | 7/2014 |
| KR | 10-2009-0093222 A | 9/2009 |
| KR | 10-2013-0131658 A | 12/2013 |
| KR | 10-2014-0056836 A | 5/2014 |
| WO | 2007/121445 A2 | 10/2007 |
| WO | 2013/146097 A1 | 10/2013 |
| WO | 2014/073443 A1 | 5/2014 |
| WO | 2014/171559 A1 | 10/2014 |
| WO | 2014/185732 A1 | 11/2014 |

* cited by examiner

MANUFACTURING METHOD AND MANUFACTURING DEVICE FOR BATTERY PACK

CROSS-REFERENCE TO RELATED APPLICATIONS

This application is a U.S. National stage application of International Application No. PCT/JP2016/080427, filed on Oct. 13, 2016, which claims priority to International Application No. PCT/JP2015/079902, filed on Oct. 22, 2015.

BACKGROUND

Field of the Invention

The present invention relates to a manufacturing method and a manufacturing device of battery packs.

Background Information

A battery pack is obtained by stacking a plurality of unit cells provided with a cell body, which includes a power generation element and is formed into a flat shape, and electrode tabs protruding out from the cell body, and spacers that support the electrode tabs. In addition, the battery pack comprises a bus bar that electrically connects a plurality of the electrode tabs.

In the manufacturing process of such a battery pack, there is a step for joining the bus bar to the electrode tab. In relation to this, for example, Japanese Unexamined Patent Application No. 2012-515418 (referred to herein as Patent Document 1) discloses a method of carrying out laser welding in a state in which the electrode tabs of each unit cell are inserted into a bent portion of the bus bar.

SUMMARY

In the joining method disclosed in Patent Document 1, there is the possibility that the positions of the electrode tabs in the stacking direction are displaced with respect to the bent portion, due to variation in the thickness of the battery cell, and the like. If the positions of the electrode tabs in the stacking direction are displaced with respect to the bent portion in this manner, the interval between the distal end portion of the electrode tab and the bus bar changes, and there is the risk that the joining quality is reduced.

In order to solve the problem described above, an object of the present invention is to provide a manufacturing method and a manufacturing device for a battery pack, whereby an electrode tab and a bus bar can be suitably joined.

The manufacturing method of a battery pack according to the present invention for achieving the object described above is a manufacturing method of a battery pack including: a cell group obtained by stacking unit cells having a cell body that includes a power generation element and has a flat shape, and electrode tabs protruding out from the cell body, and spacers for supporting the electrode tabs; and a bus bar that is joined to the electrode tabs to electrically connect the electrode tabs. The method comprises an electrode tab positioning step for positioning joining portions of the electrode tabs to the bus bar at predetermined positions in a movement direction of the spacers by moving the spacers in one direction in a state in which the unit cells and the spacers are stacked, before the bus bar is joined to the electrode tabs. In addition, the method comprises a joining step for joining the bus bar to the electrode tabs in a state in which the joining portions of the electrode tabs are positioned at the predetermined positions.

Additionally, the manufacturing device for a battery pack according to the present invention for achieving the object described above is a manufacturing device for a battery pack including: a cell group obtained by stacking unit cells having a cell body that includes a power generation element and has a flat shape, and electrode tabs protruding out from the cell body, and spacers for supporting the electrode tabs; and a bus bar joined to the electrode tabs to electrically connect the electrode tabs. The manufacturing device for a battery pack comprises moving means for positioning joining portion of the electrode tabs on the bus bar at predetermined positions in a movement direction of the spacers by moving the spacers in one direction in a state in which the unit cells and the spacers are stacked. In addition, the manufacturing device for a battery pack comprises joining means for joining the bus bar to the electrode tabs in a state in which the joining portions of the electrode tabs are positioned at predetermined positions.

DETAILED DESCRIPTION OF EMBODIMENTS

Figure 1:
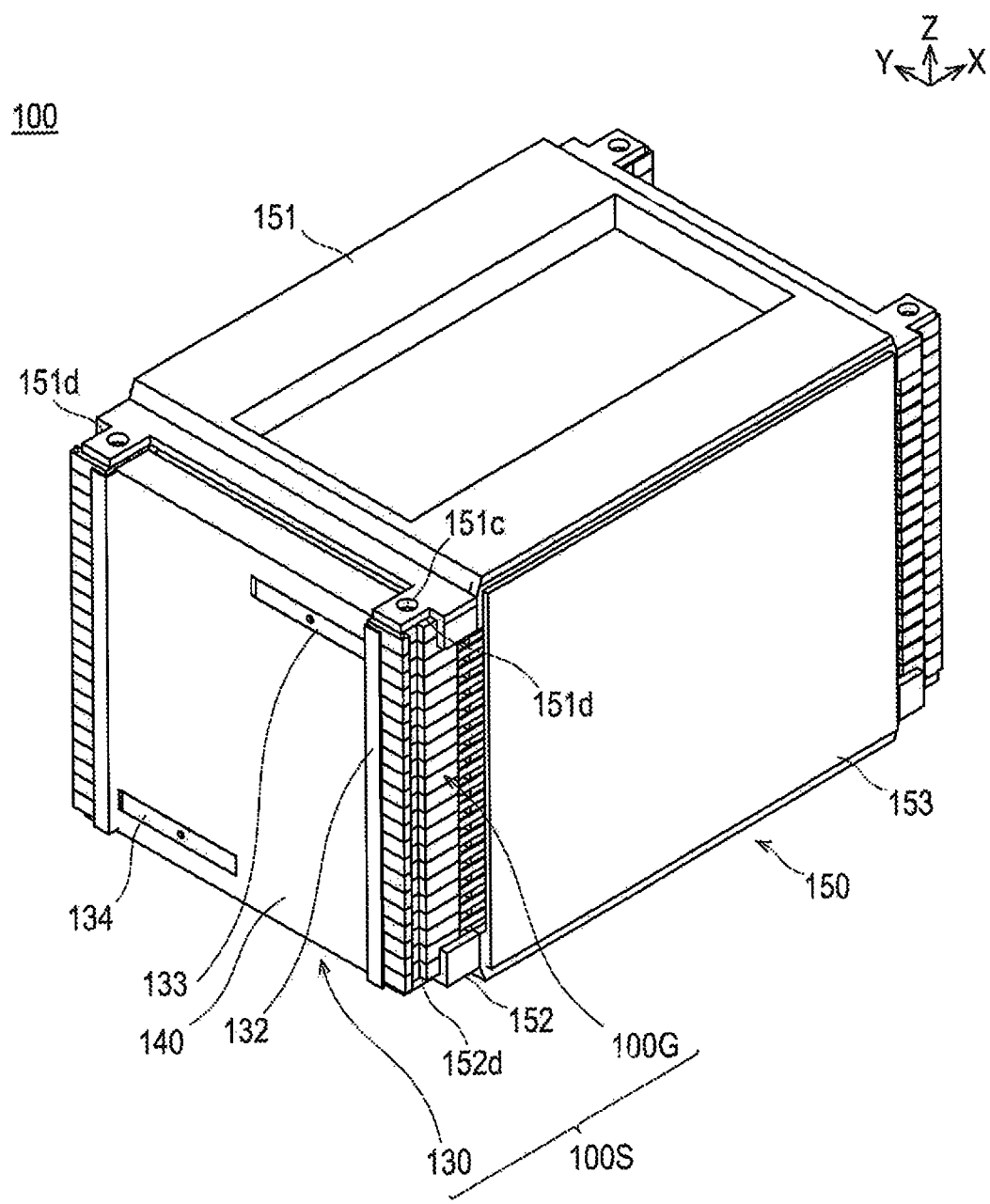
FIG. 1 is a perspective view illustrating a battery pack according to an embodiment of the present invention.

Embodiments of the present invention will be explained below, with reference to the appended drawings. In the explanations of the drawings the same elements are given the same reference symbols, and overlapping explanations are omitted. The sizes and ratios of the members in the drawing are exaggerated for convenience of explanation and may be different from the actual sizes and ratios. The orientation is shown using arrows indicated by X, Y, and Z in the drawings. The direction of the arrow indicated by X indicates a direction that intersects with the stacking direction of the unit cell 110 and a direction along the longitudinal direction of the unit cell 110. The direction of the arrow indicated by Y indicates a direction that intersects with the stacking direction of the unit cell 110 and a direction along the short side direction of the unit cell 110. The direction of the arrow indicated by Z is the stacking direction of the unit cell 110.

First, a battery pack 100 according to an embodiment of the present invention will be described with reference to FIGS. 1-8.

Figure 2:
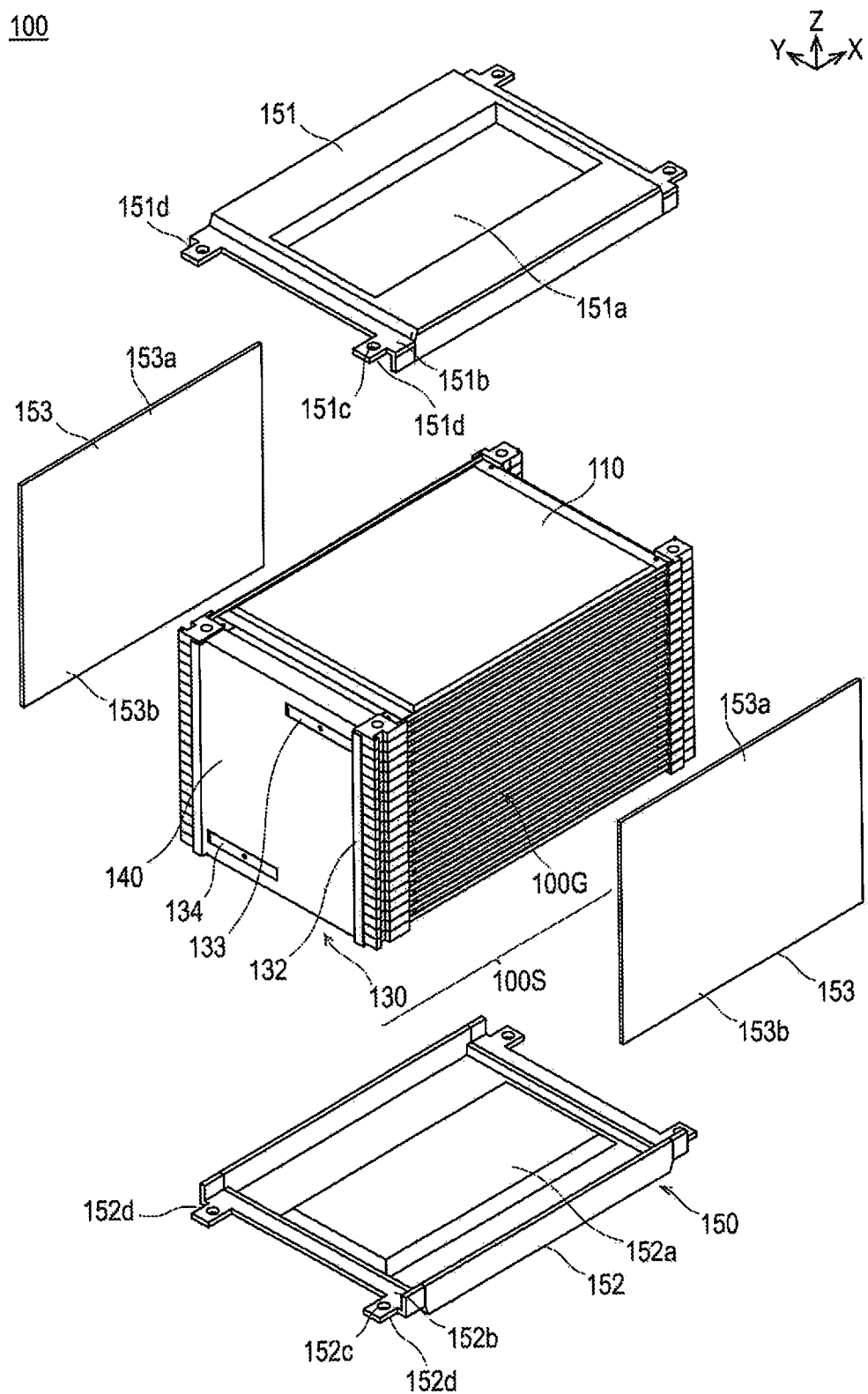
FIG. 2 is a perspective view illustrating a state in which the entire stacked body, in a state in which an upper pressure plate, a lower pressure plate, and left and right side plates are disassembled from the battery pack illustrated in FIG. 1 and a protective cover is attached thereto, is exposed.
Figure 3:
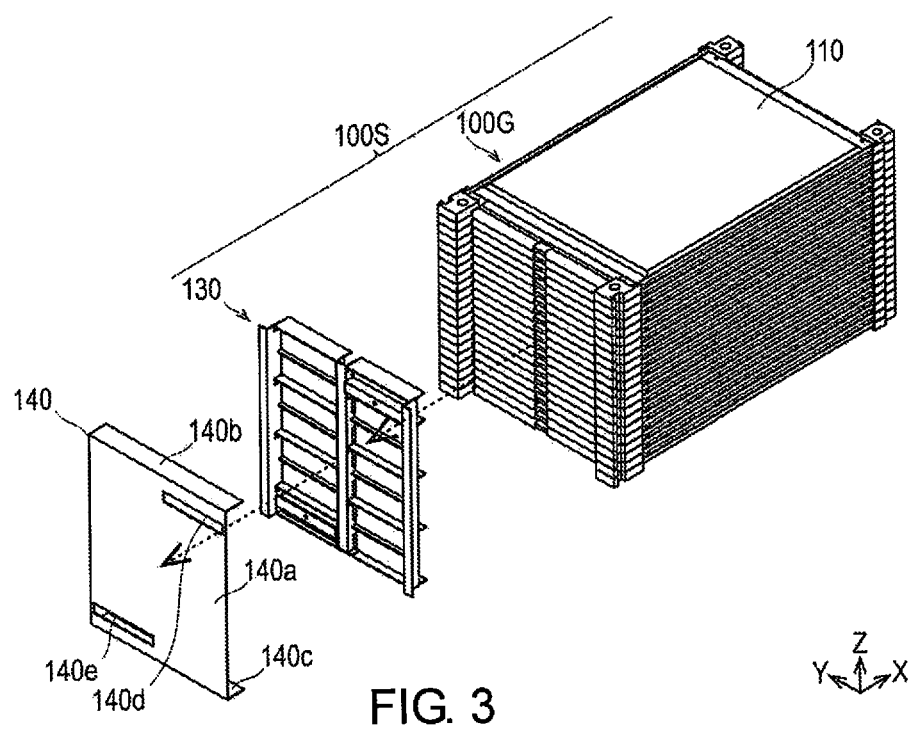
FIG. 3 is a perspective view illustrating a state in which the protective cover is detached from the stacked body illustrated in FIG. 2 and the stacked body is disassembled into a cell group and a bus bar unit.
Figure 4:
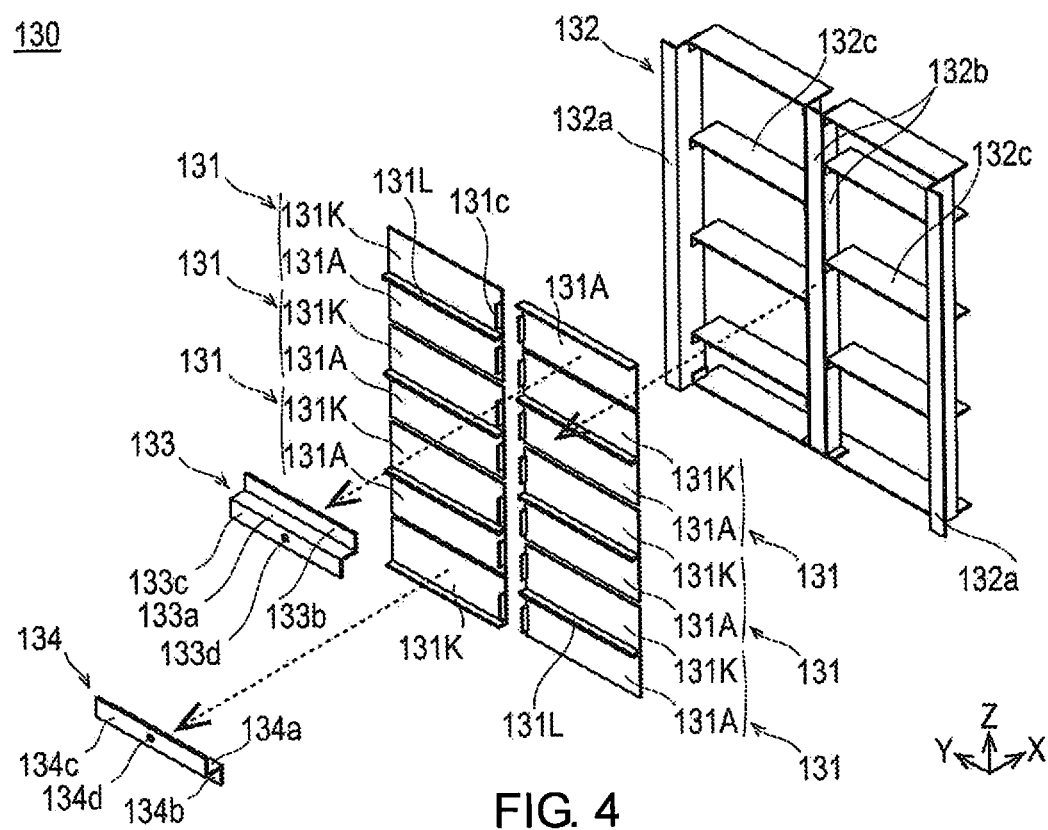
FIG. 4 is an exploded perspective view illustrating the bus bar unit illustrated in FIG. 3.
Figure 5:
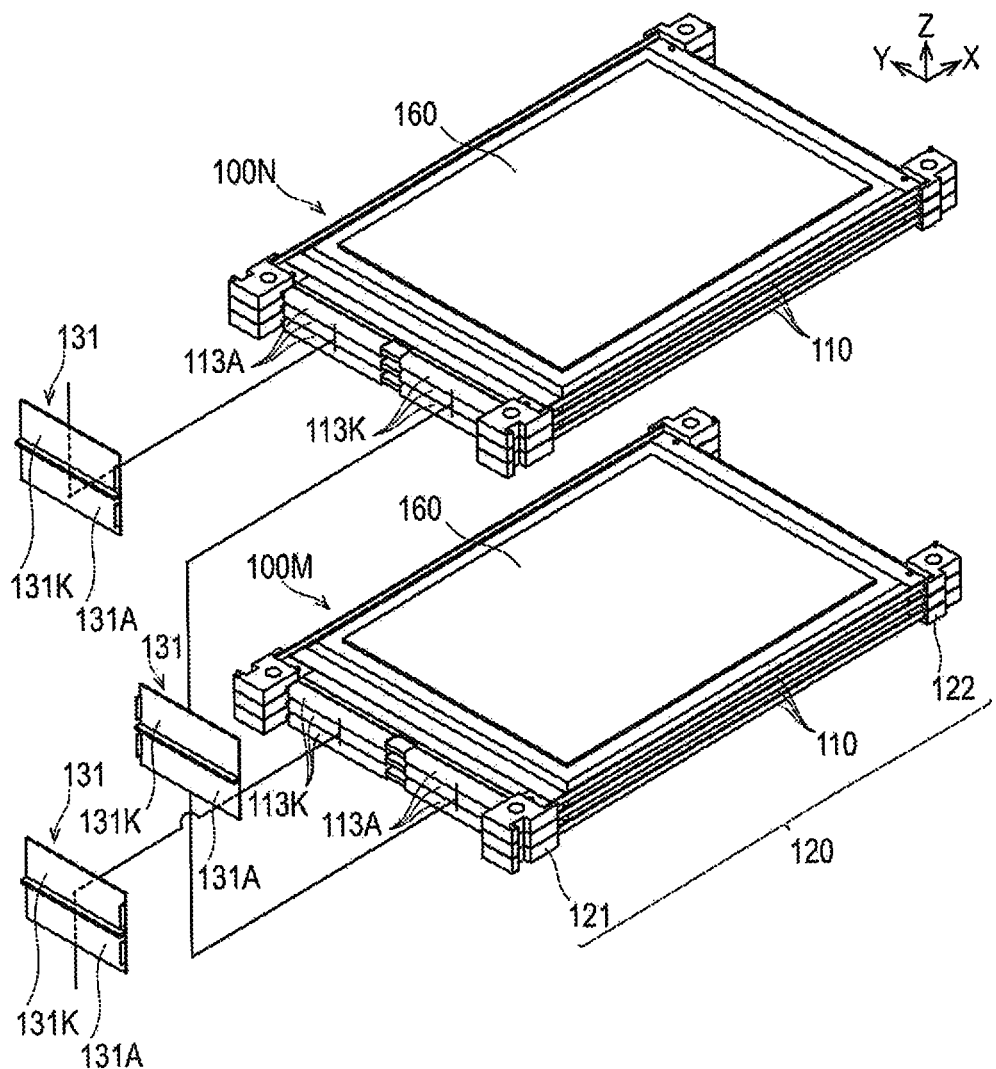
FIG. 5 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are joined by means of a bus bar.
Figure 6A:
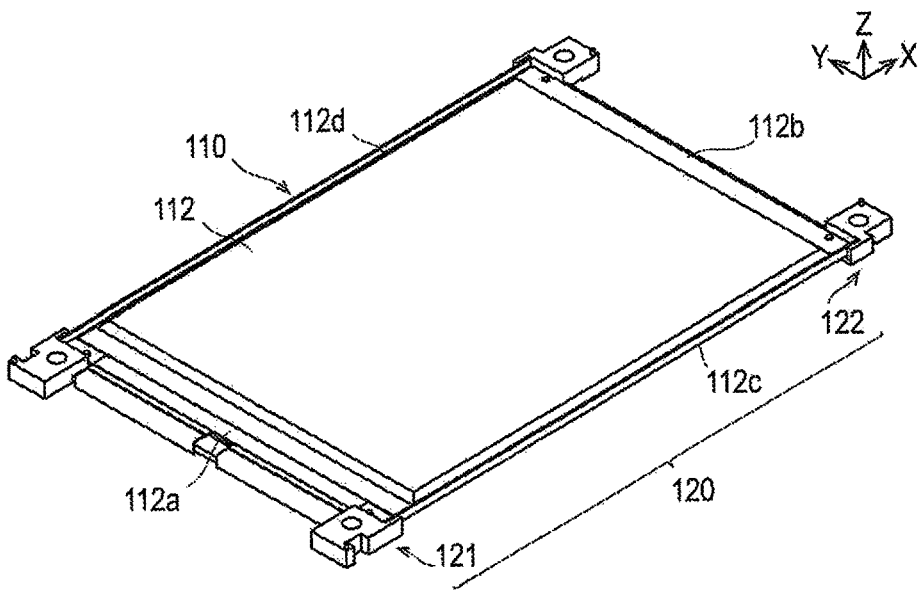
FIG. 6A is a perspective view illustrating a state in which a pair of spacers (first spacer and second spacer) is attached to a unit cell.
Figure 6B:
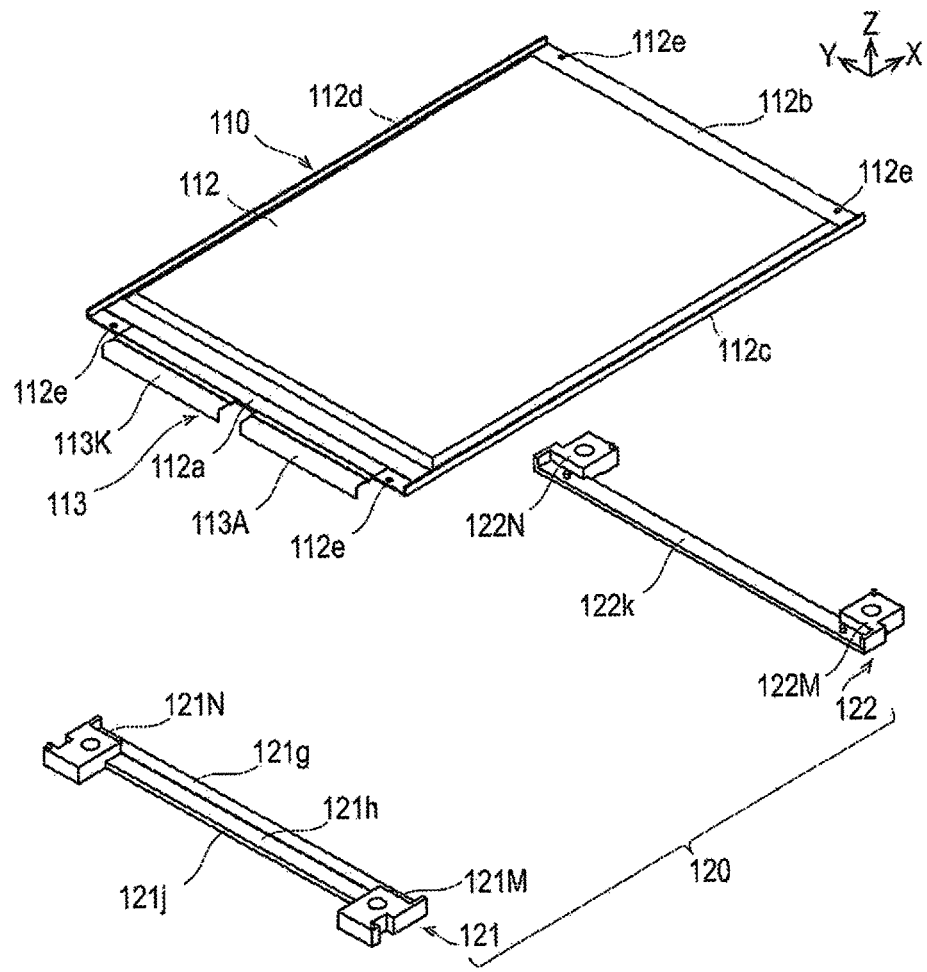
FIG. 6B is a perspective view illustrating a state before the pair of spacers (first spacer and second spacer) is attached to the unit cell.
Figure 7:
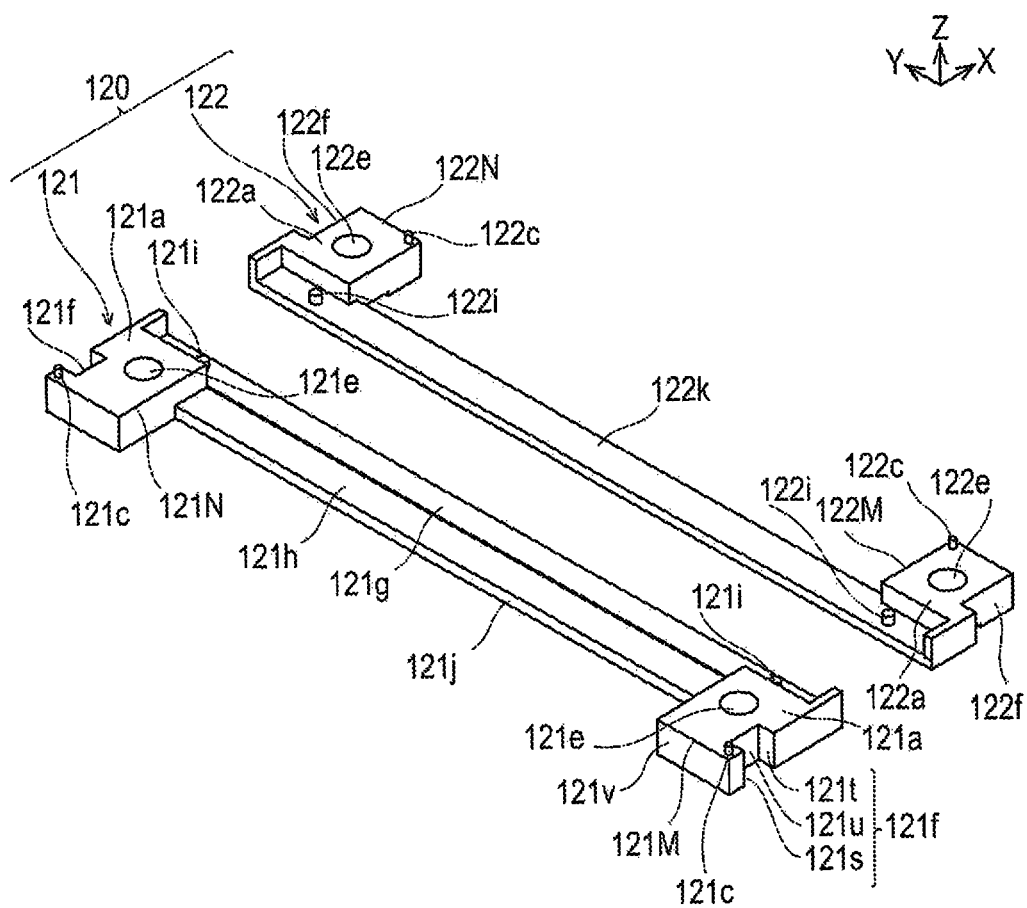
FIG. 7 is a perspective view illustrating the pair of spacers (first spacer and second spacer).
Figure 8A:
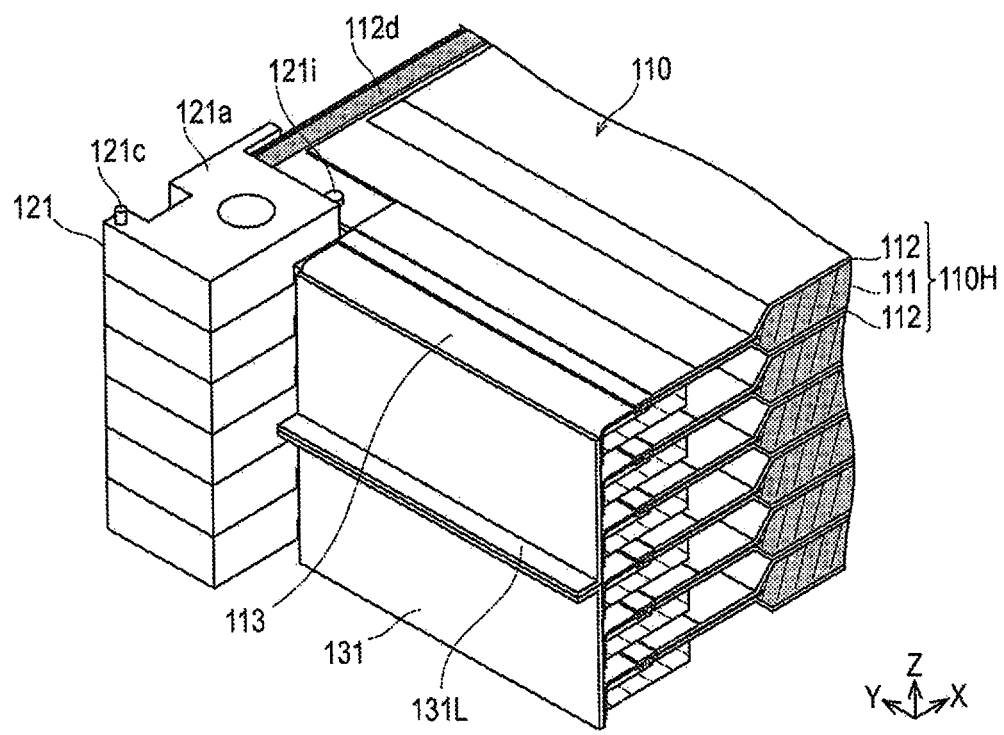
FIG. 8A is a perspective view illustrating a cross-section of the principle part of a state in which a bus bar is joined to the electrode tabs of stacked unit cells.
Figure 8B:
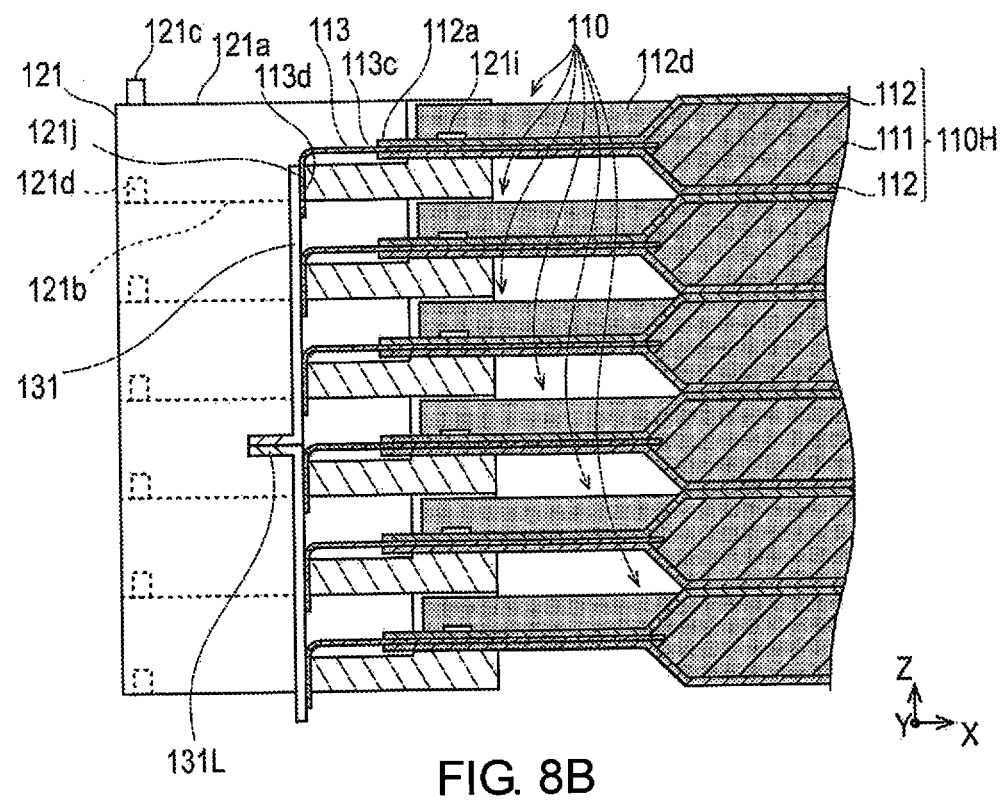
FIG. 8B is a side view illustrating FIG. 8A as viewed from the side.

FIG. 1 is a perspective view illustrating the battery pack 100 according to the present embodiment. FIG. 2 is a perspective view illustrating a state in which the entire stacked body 100S, in a state in which an upper pressure plate 151, a lower pressure plate 152, and left and right side plates 153 are disassembled from the battery pack 100 illustrated in FIG. 1 and a protective cover 140 is attached thereto, is exposed. FIG. 3 is a perspective view illustrating a state in which the protective cover 140 is detached from the stacked body 100S illustrated in FIG. 2 and the stacked body 100S is disassembled into a cell group 100G and a bus bar unit 130. FIG. 4 is an exploded perspective view illustrating the bus bar unit 130 illustrated in FIG. 3. FIG. 5 is an exploded perspective view schematically illustrating a state in which an anode side electrode tab 113A of a first cell sub-assembly 100M (set of three of the unit cells 110 connected in parallel) and a cathode side electrode tab 113K of a second cell sub-assembly 100N (set of three of the unit cells 110 connected in parallel) are joined by a bus bar 131. FIG. 6A is a perspective view illustrating a state in which a pair of spacers 120 (a first spacer 121 and a second spacer 122) is attached to one of the unit cells 110, and FIG. 6B is a perspective view illustrating a state before the pair of the spacers 120 (the first spacer 121 and the second spacer 122) is attached to one of the unit cells 110. FIG. 7 is a perspective view illustrating the pair of the spacers 120 (the first spacer 121 and the second spacer 122). FIG. 8A is a perspective view illustrating a cross-section of the principle part of a state in which the bus bar 131 is joined to the electrode tabs 113 of the stack of the unit cells 110, and FIG. 8B is a side view illustrating FIG. 8A as viewed from the side.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises a stacked body 100S including a cell group 100G formed by stacking a plurality of the unit cells 110 having a flat shape in the thickness direction, as illustrated in FIG. 1 and FIG. 2. The battery pack 100 further comprises a protective cover 140 attached to the front side of the stacked body 100S, and a chassis 150 that houses the stacked body 100S in a state in which each of the unit cells 110 is pressurized along the stacking direction of the unit cells 110. The stacked body 100S comprises the cell group 100G and the bus bar unit 130 attached to the front side of the cell group 100G and that integrally holds a plurality of the bus bars 131, as illustrated in FIG. 3. The protective cover 140 covers and protects the bus bar unit 130. The bus bar unit 130 comprises a plurality of the bus bars 131 and a bus bar holder 132 that integrally attaches the plurality of the bus bar 131 in a matrix, as illustrated in FIG. 4. Of the plurality of the bus bars 131, an anode side terminal 133 is attached to the terminal end on the anode side and a cathode side terminal 134 is attached to the terminal end on the cathode side. The battery pack 100 will be described in detail below.

The cell group 100G is configured by connecting, in series, a first cell sub-assembly 100M comprising three of the unit cells 110 electrically connected in parallel and a second cell sub-assembly 100N comprising three different ones of the unit cells 110 electrically connected in parallel by the bus bars 131, as illustrated in FIG. 5.

The first cell sub-assembly 100M and the second cell sub-assembly 100N have the same configuration, excluding the bent directions of the distal end portions 113d of the electrode tabs 113 of the unit cells 110. Specifically, the second cell sub-assembly 100N is one in which the top and bottom of the unit cells 110 included in the first cell sub-assembly 100M are reversed. However, the bent directions of the distal end portions 113d of the electrode tabs 113 of the second cell sub-assembly 100N is aligned on the lower side of the stacking direction Z so as to be the same as the bent directions of the distal end portions 113d of the electrode tabs 113 of the first cell sub-assembly 100M. A pair of spacers 120 (first spacer 121 and second spacer 122) is attached to each of the unit cells 110.

The unit cell 110 corresponds to, for example, a flat lithium ion secondary battery. The unit cell 110 comprises a cell body 110H obtained by sealing a power generation element 111 with a pair of laminate films 112, and a thin plate shaped electrode tab 113 that is electrically connected to the power generation element 111 and protruding out from the cell body 110H to the outside, as illustrated in FIG. 6 and FIG. 8.

The power generation element 111 is formed by stacking a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of laminate films 112 covers the power generation element 111 from both sides along the stacking direction Z to seal the four sides thereof. In the pair of laminate films 112, an anode side electrode tab 113A and a cathode side electrode tab 113K protrude out from between end portions 112a along the short side direction Y to the outside, as illustrated in FIG. 6.

In the laminate film 112, a pair of connecting pins 121i of the first spacers 121 are respectively inserted into a pair of connecting holes 112e respectively provided on both ends of the end portion 112a along the short side direction Y, as illustrated in FIG. 6 and FIG. 7. On the other hand, in the laminate film 112, a pair of connecting pins 122i of the second spacers 122 are respectively inserted into a pair of connecting holes 112e respectively provided on both ends of the other end portion 112b along the short side direction Y. In the laminate film 112, two end portions 112c and 112d along the longitudinal direction X are formed bent upward in the stacking direction Z. In the laminate film 112, the two end portions 112c and 112d along the longitudinal direction X may be formed bent downward in the stacking direction Z.

The electrode tab 113 is configured from an anode side electrode tab 113A and a cathode side electrode tab 113K, which respectively extend from between one end portion 112a of a pair of laminate films 112 toward the outside, in a state of being separated from each other, as illustrated in FIG. 6 and FIG. 8. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape running from a proximal end portion 113c adjacent to the cell body 110H to the distal end portion 113d, as illustrated in FIG. 8. Specifically, the electrode tab 113 extends from the proximal end portion 113c thereof along one side in the longitudinal direction X. On the other hand, the distal end portion 113d of the electrode tab 113 is formed folded downward along the stacking direction Z. The shape of the distal end portion 113d of the electrode tab 113 is not limited to an L shape. The distal end portion 113d of the electrode tab 113 is formed in a planar shape so as to face the bus bar 131. The electrode tab 113 may be formed in a U shape by further extending the distal end portion 113d and folding the extended portion along the proximal end portion 113c on the cell body 110H side. On the other hand, the proximal end portion 113c of the electrode tab 113 may be formed in a wave shape or a curved shape.

In the stack of the unit cells 110, the distal end portion 113d of each electrode tab 113 is aligned and folded downward in the stacking direction Z, as illustrated in FIG. 5 and FIG. 8. Here, in the battery pack 100, three of the unit cells 110 electrically connected in parallel (first cell sub-assembly 100M) and three different ones of the unit cells 110 electrically connected in parallel (second cell sub-assembly 100N) are connected in series, as illustrated in FIG. 5. Therefore, the top and bottom of the unit cells 110 are interchanged every three of the unit cells 110, such that the positions of the anode side electrode tabs 113A and the cathode side electrode tabs 113K of the unit cells 110 crisscross along the stacking direction Z.

However, if the top and bottom are simply interchanged every three of the unit cells 110, the positions of the distal end portions 113d of the electrode tabs 113 will vary in the vertical direction along the stacking direction Z; therefore, all of the distal end portions 113d of the electrode tabs 113 of the unit cells 110 are adjusted and folded so that the positions thereof will be aligned.

In the first cell sub-assembly 100M illustrated in the lower part of FIG. 5, the anode side electrode tab 113A is disposed on the right side of the drawing and the cathode side electrode tab 113K is disposed on the left side of the drawing. On the other hand, in the second cell sub-assembly 100N illustrated in the upper part of FIG. 5, the cathode side electrode tab 113K is disposed on the right side of the drawing and the anode side electrode tab 113A is disposed on the left side of the drawing.

In this manner, even if the arrangement of the anode side electrode tab 113A and the cathode side electrode tab 113K is different, the distal end portion 113d of the electrode tab 113 of the unit cell 110 is folded downward along the stacking direction Z. In addition, the distal end portions 113d of the electrode tabs 113 are arranged on the same side of the stacked body 100S, as illustrated in FIG. 3. A double-sided tape 160 that is joined to a stacking member to be stacked above is adhered to the unit cells 110 positioned on the upper surfaces of the first cell sub-assembly 100M and the second cell sub-assembly 100N.

The pair of spacers 120 (the first spacer 121 and the second spacer 122) is disposed between the stack of the unit cells 110, as illustrated in FIG. 5 and FIG. 8. The first spacers 121 are disposed along one end portions 112a of the laminate films 112 where the electrode tabs 113 of the unit cells 110 protrude, as illustrated in FIG. 6. The second spacers 122 are disposed along the other end portions 112b of the laminate films 112, as illustrated in FIG. 6. The second spacers 122 have configurations in which the shape of the first spacers 121 are simplified. A plurality of the unit cells 110 is stacked in the stacking direction Z, after attaching a pair of the spacers 120 (the first spacer 121 and the second spacer 122) to each. The pair of the spacers 120 (the first spacer 121 and the second spacer 122) are made of reinforced plastics having insulating properties. Below, after describing the configuration of the first spacers 121, the configuration of the second spacers 122 will be described while comparing with the configuration of the first spacers 121.

The first spacer 121 is formed of a rectangular parallelepiped shape, elongated along the short side direction Y, as illustrated in FIG. 6 and FIG. 7. The first spacer 121 is provided with placing portions 121M and 121N on the two ends in the longitudinal direction thereof (short side direction Y).

When the first spacer 121 is stacked in a state of being attached to one of the unit cells 110, the upper surfaces 121a of the placing portions 121M and 121N of one the first spacers 121 and the lower surfaces 121b of the placing portions 121M and 121N of another one of the first spacers 121 that is disposed above the one of the first spacer 121 come in contact, as illustrated in FIG. 8B.

In the first spacer 121, in order to relatively position the plurality of the unit cells 110 to be stacked, positioning pins 121c are provided on the upper surface 121a of the first spacers 121 that are fitted into positioning holes 121d that is opened on the lower surface 121b of another one of the first spacers 121 and that correspond to the positions of the positioning pins 121c, as illustrated in FIG. 7 and FIG. 8B.

In the first spacers 121, a locating hole 121e for inserting a bolt that connects a plurality of battery packs 100 to each other along the stacking direction Z is opened in each of the placing portions 121M and 121N along the stacking direction Z, as illustrated in FIG. 7.

The first spacer 121 comprises an outer side surface along the short side direction Y of the placing portion 121M and recessed portion 121f on the outer side surface along the short side direction Y of the placing portion 121N, formed by cutting out in a concave shape along the stacking direction Z, as illustrated in FIG. 7. In the manufacturing method of a battery pack 100 to be described later, the recessed portion 121f engages with a protruding portion 731 provided on the engagement jig 730.

The recessed portion 121f comprises a first surface 121s positioned on the front side, a second surface 121t provided on the rear side, and a joining surface that connects the first surface 121s and the second surface 121t, as illustrated in FIG. 7.

The first spacer 121 comprises an extending surface 121v that extends on the front side (distal end side where the electrode tab 113 faces the bus bar 131) along the stacking direction Z, as illustrated in FIG. 7.

The first spacer 121 is formed such that the region between the placing portions 121M and 121N is notched from the upper side of the stacking direction Z, as illustrated in FIG. 6B and FIG. 7. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the end portion 112a of the laminate film 112, in which the electrode tab 113 is protruded, on the first supporting surface 121g, as illustrated in FIG. 6. The first spacer 121 is provided with a pair of connecting pins 121i protruding upward from both ends of the first supporting surface 121g.

The first spacer 121 is provided with a supporting portion 121j, which abuts the electrode tab 113 from the opposite side of the bus bar 131 and supports the distal end portion 113d of the electrode tab 113 of the unit cell 110, on the side surface adjacent to the second supporting surface 121h along the stacking direction Z, as illustrated in FIG. 8. The supporting portion 121j of the first spacer 121 sandwiches the distal end portion 113d of the electrode tab 113 together with the bus bar 131 such that the distal end portion 113d and the bus bar 131 are sufficiently abutting each other.

The second spacers 122 have a configuration in which the shape of the first spacers 121 is simplified, as illustrated in FIG. 6 and FIG. 7. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with a supporting surface 122k. Specifically, the second spacer 122 is provided with placing portions 122M and 122N, in the same manner as the first spacer 121. The second spacer 122 is provided with the supporting surface 122k in the portion where the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with a plurality of the bus bars 131, as illustrated in FIG. 3 and FIG. 4. The bus bar 131 is made of a metal having electrical conductivity and electrically connects the distal end portions 113d of the electrode tabs 113 of different unit cells 110 to each other. The bus bar 131 is formed in a flat plate shape and is erected along the stacking direction Z.

The bus bar 131 is integrally formed by joining an anode side bus bar 131A that is laser-welded to an anode side electrode tab 113A of one of the unit cells 110 and a cathode side bus bar 131K that is laser-welded to a cathode side electrode tab 113K of another unit cell 110 adjacent along the stacking direction Z.

The anode side bus bar 131A and the cathode side bus bar 131K have the same shape and are respectively formed in an L shape, as illustrated in FIG. 4 and FIG. 8. The anode side bus bar 131A and the cathode side bus bar 131K are superimposed with the top and bottom inverted. Specifically, the bus bar 131 is integrated by joining a folded portion 131L obtained by folding one end portion of the anode side bus bar 131A along the stacking direction Z and a folded portion 131L obtained by folding one end portion of the cathode side bus bar 131K along the stacking direction Z. The anode side bus bar 131A and the cathode side bus bar 131K are provided with side portions 131c at one end in the short side direction Y along the longitudinal direction X, as illustrated in FIG. 4. The side portions 131c are joined to the bus bar holder 132.

The anode side bus bar 131A is made of aluminum in the same manner as the anode side electrode tab 113A. The cathode side bus bar 131K is made of copper, in the same manner as the cathode side electrode tab 113K. The anode side bus bar 131A and the cathode side bus bar 131K made of different metals are joined to each other by ultrasonic joining.

For example, if the battery pack 100 is configured by connecting, in series, a plurality of sets of three of the unit cells 110 connected in parallel, as illustrated in FIG. 5, the anode side bus bar 131A portion of the bus bar 131 is laser-welded to the anode side electrode tabs 113A of three of the unit cells 110 that are adjacent to each other along the stacking direction Z. In the same manner, the cathode side bus bar 131K portion of the bus bar 131 is laser-welded with the cathode side electrode tabs 113K of three of the unit cells 110 that are adjacent to each other along the stacking direction Z.

However, among the bus bars 131 arranged in a matrix shape, the bus bar 131 positioned on the upper right in the drawing in FIG. 3 and FIG. 4 corresponds to the anode side terminal ends of 21 of the unit cells 110 (3 parallel 7 series) and is configured from only an anode side bus bar 131A. This anode side bus bar 131A is laser-welded to the anode side electrode tabs 113A of the three uppermost unit cells 110 of the cell group 100G. In the same manner, among the bus bars 131 arranged in a matrix shape, the bus bar 131 positioned on the lower left in the drawing in FIG. 3 and FIG. 4 corresponds to the cathode side terminal ends of 21 of the unit cells 110 (3 parallel 7 series) and is configured from only a cathode side bus bar 131K. This cathode side bus bar 131K is laser-welded to the cathode side electrode tabs 113K of the three lowermost unit cells 110 of the cell group 100G.

The bus bar holder 132 integrally holds a plurality of bus bars 131 in a matrix so as to face the electrode tab 113 of each of a plurality of the stack of the unit cells 110, as illustrated in FIG. 3. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacers 121 that support the electrode tabs 113 of the unit cells 110, as illustrated in FIG. 4. The pair of columnar support portions 132a is fitted on the side surfaces of the placing portions 121M and 121N of the first spacer 121. The pair of columnar support portions 132a have an L shape when viewed along the stacking direction Z and are formed in a plate shape extended along the stacking direction Z. The bus bar holder 132 is provided with a pair of auxiliary columnar support portions 132b erected along the stacking direction Z so as to be positioned in the vicinity of the center of the first spacer 121 in the longitudinal direction. The pair of auxiliary columnar support portions 132b is formed in a plate shape extended along the stacking direction Z.

The bus bar holder 132 comprises insulating portions 132c that respectively protrude between adjacent bus bars 131 along the stacking direction Z, as illustrated in FIG. 4. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between bus bars 131 of the unit cells 110 that are adjacent to each other along the stacking direction Z.

The bus bar holder 132 may be configured by joining the columnar support portion 132a, the auxiliary columnar support portion 132b, and the insulating portion 132c, which are independently formed, or by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 3 and FIG. 4.

The anode side terminal 133 is joined to the anode side bus bar 131A positioned on the upper right in the drawing, from among the bus bars 131 arranged in a matrix, as illustrated in FIG. 3 and FIG. 4. The anode side terminal 133 is made of a metal plate having electrical conductivity and, when viewed along the short side direction Y, has a shape in which the one end portion 133b and the other end portion 133c are folded in different directions along the stacking direction Z with reference to the central portion 133a. The one end portion 133b is laser-welded to the anode side bus bar 131A. An external input/output terminal is connected to a hole 133d (including the screw groove) opened in the center of the other end portion 133c.

The cathode side terminal 134 corresponds to the cathode side terminal end of the cell group 100G configured by alternately stacking the first cell sub-assembly 100M and the second cell sub-assembly 100N, as illustrated in FIG. 3 and FIG. 4. The cathode side terminal 134 is joined to the cathode side bus bar 131K positioned on the lower left in the drawing, from among the bus bars 131 arranged in a matrix, as illustrated in FIG. 3 and FIG. 4. The cathode side terminal 134 is configured in the same manner as the anode side terminal 133.

The protective cover 140 prevents the bus bars 131 from short-circuiting with each other and from coming in contact with an external member and being short-circuited or causing electrical leakage, by covering the bus bar unit 130, as illustrated in FIGS. 1-3. Furthermore, the protective cover 140 exposes the anode side terminal 133 and the cathode side terminal 134 to the outside and causes the power generation element 111 of each of the unit cells 110 to charge and discharge. The protective cover 140 is made of plastics having insulating properties.

The protective cover 140 is formed in a flat plate shape and is erected along the stacking direction Z, as illustrated in FIG. 3. The protective cover 140 has a shape in which the upper end 140b and the lower end 140c of the side surface 140a thereof are folded along the longitudinal direction X and is fitted on the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 2 and FIG. 3. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1 and FIG. 2. An appropriate surface pressure is imparted to the power generation element 111 by sandwiching and pressurizing the power generation element 111 of each of the unit cells 110 provided on the cell group 100G with the upper pressure plate 151 and the lower pressure plate 152.

The upper pressure plate 151 is disposed above the cell group 100G along the stacking direction Z, as illustrated in FIG. 1 and FIG. 2. The upper pressure plate 151 is provided with a pressing surface 151a protruding downward along the stacking direction Z in the center thereof. The power generation element 111 of each of the unit cells 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121 or the placing portions 122M and 122N of the second spacer 122. A locating hole 151c, which communicates with the positioning hole 121d of the first spacer 121 or the positioning hole 122d of the second spacer 122 along the stacking direction Z, is opened in the center of the holding portion 151b. A bolt that connects battery packs 100 with each other is inserted into the locating hole 151c. The upper pressure plate 151 is made of a metal plate having a sufficient thickness.

The upper pressure plate 151 has notched portions 151d on the outer sides of the locating holes 151c in the Y direction, as illustrated in FIG. 2. Since the upper pressure plate 151 has notched portions 151d in this manner, it is possible to engage the protruding portions 731 of the engagement jigs 730 with the recessed portions 121f of the plurality of first spacers 121, in the electrode tab positioning step of the manufacturing method of a battery pack 100 to be described later.

The lower pressure plate 152 has the same configuration as the upper pressure plate 151 and is formed by reversing the top and bottom of the upper pressure plate 151, as illustrated in FIG. 1 and FIG. 2. The lower pressure plate 152 is disposed below the cell group 100G along the stacking direction Z. The lower pressure plate 152 presses the power generation element 111 of each of the unit cells 110 upward with the pressing surface 151a protruding upward along the stacking direction Z.

The lower pressure plate 152 has notched portions 152d on the outer sides of the locating holes 152c in the Y direction, as illustrated in FIG. 2. Since the lower pressure plate 152 has notched portions 152d in this manner, it is possible to engage the protruding portions 731 of the engagement jigs 730 with the recessed portions 121f of the plurality of first spacers 121, in the electrode tab positioning step of the manufacturing method of a battery pack 100 to be described later.

One pair of side plates 153 fixes the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1 and FIG. 2. The side plate 153 is made of a rectangular metal plate and is erected along the stacking direction Z. One pair of side plates 153 is joined to the upper pressure plate 151 and the lower pressure plate 152 from both sides in the short side direction Y of the cell group 100G by laser welding. Each side plate 153 is subjected to seam welding or spot welding at the upper end 153a portion that abuts the upper pressure plate 151 along the longitudinal direction X. In the same manner, each side plate 153 is subjected to seam welding or spot welding at the lower end 153b portion that abuts the lower pressure plate 152 along the longitudinal direction X. The pair of side plates 153 covers and protects both sides of the cell group 100G in the short side direction Y.

Next, the manufacturing method and the manufacturing device 700 for the battery pack 100 will be described, with reference to FIGS. 9-23.

The manufacturing method of a battery pack 100 comprises a stacking step (FIG. 9) for stacking the members configuring the battery pack 100. The manufacturing method of a battery pack 100 comprises an electrode tab positioning step (FIGS. 10-13, FIGS. 16-19) for positioning the joining portion of the electrode tab 113 on the bus bar 131 at a predetermined position. The electrode tab positioning step comprises a spacer positioning step (FIGS. 10-13) for moving the first spacer 121 in one direction in a state in which the unit cell 110 and the first spacer 121 are stacked. In addition, the electrode tab positioning step comprises a contact step (FIGS. 16-19) for bringing the distal end portion 113d of the electrode tab 113 in contact with the first spacer 121 by means of the bus bar 131, by moving the bus bar 131 to the cell body 110H side. In addition, the manufacturing method of a battery pack 100 comprises a pressurizing step (FIG. 14) for pressurizing the cell group 100G of the battery pack 100 and a first joining step (FIG. 15) for joining the side plates 153 to the upper pressure plate 151 and the lower pressure plate 152. Additionally, the manufacturing method of a battery pack 100 comprises a second joining step (FIGS. 20-22) for joining the bus bar 131 to the electrode tab 113 of the unit cell 110 and joining the terminal to the bus bar 131. In addition, the manufacturing method of a battery pack 100 comprises a mounting step (FIG. 23) in which the protective cover 140 is attached to the bus bar 131.

Figure 9:
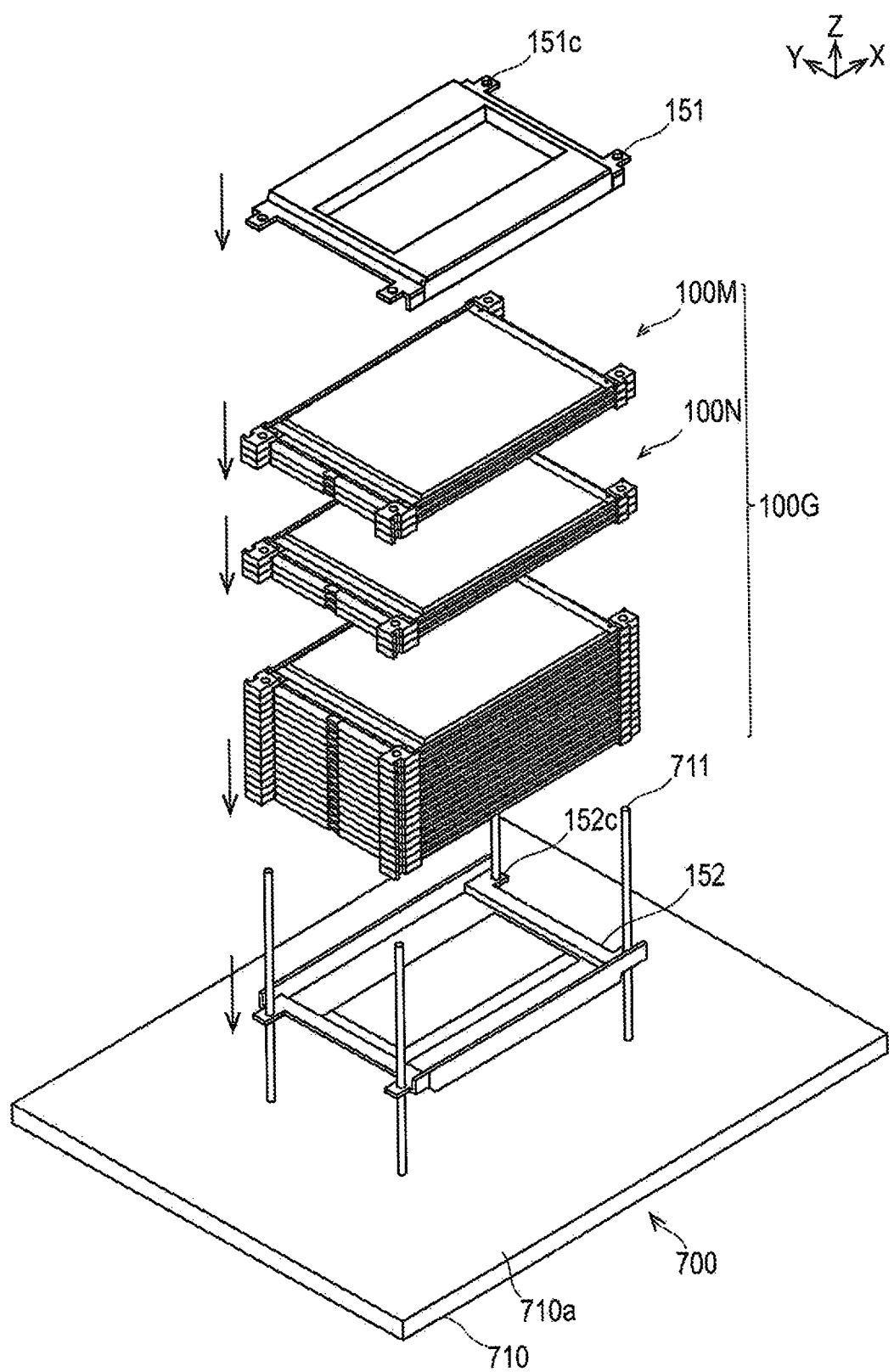
FIG. 9 is a view illustrating the battery pack manufacturing method according to an embodiment of the present invention, and a perspective view schematically illustrating a state in which members constituting a battery pack are sequentially stacked on a mounting table.
Figure 10:
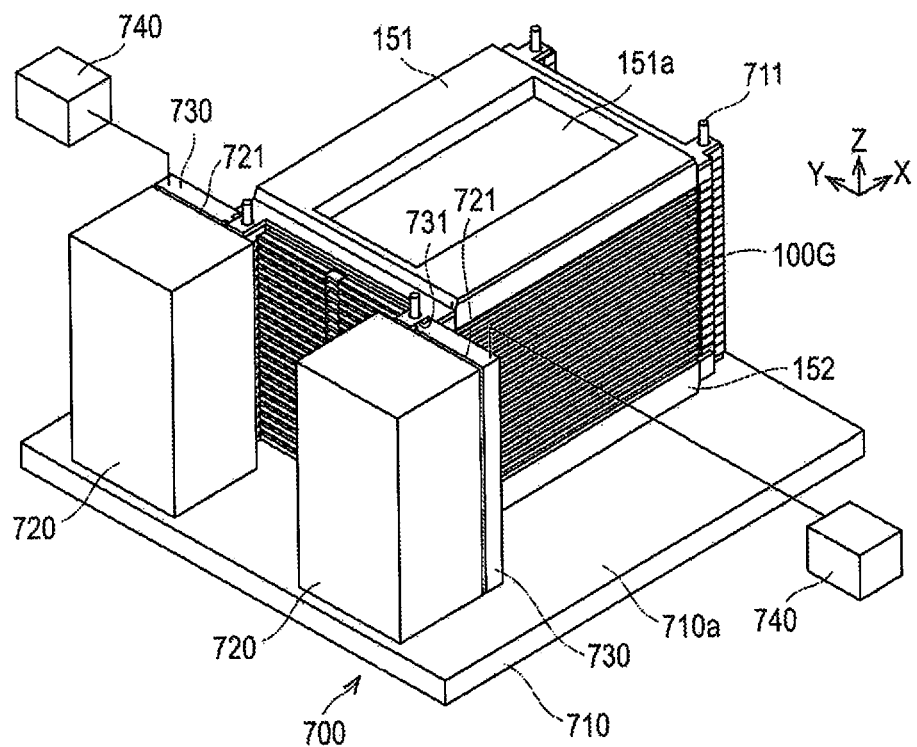
FIG. 10 is a perspective view illustrating a state in which a reference jig is disposed on a mounting table and a protruding portion of an engagement jig is engaged with the recessed portion of the first spacer.
Figure 11:
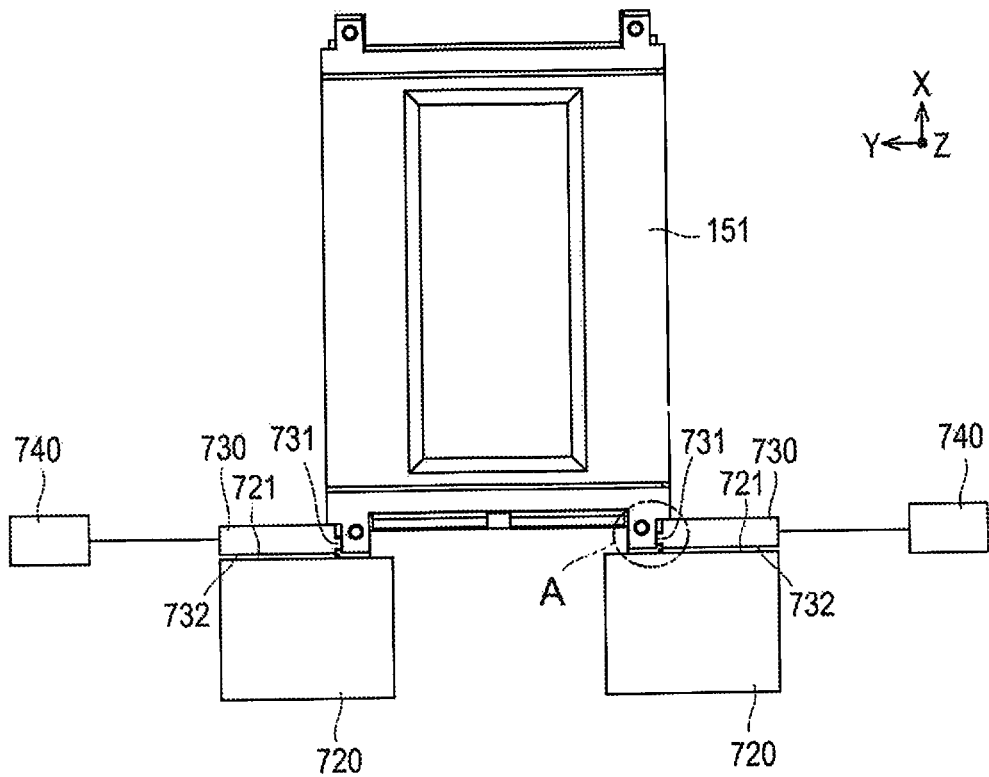
FIG. 11 is an upper surface view illustrating the state of FIG. 10.

Additionally, the manufacturing device 700 for a battery pack 100 comprises a mounting table 710 on which members constituting the battery pack 100 are mounted and a reference jig 720 equipped with a reference surface 721 to which the extending surface 121v of the first spacer 121 is abutted, as illustrated in FIGS. 9-11. In addition, the manufacturing device 700 for a battery pack 100 comprises an engagement jig 730 that can engage with the recessed portion 121f of the first spacer 121, a moving means 740 that moves the engagement jig 730, and a pressurizing jig 750 used during the pressurizing step, as illustrated in FIGS. 10-15. Additionally, the manufacturing device 700 for a battery pack 100 comprises a pushing plate 760 used in the first joining step, a contact jig 780 that moves the bus bar 131 onto the cell body 110H side, and a laser oscillator (joining means) 770 that is used for laser welding, as illustrated in FIGS. 15-21. Each step of the manufacturing method of a battery pack 100, and each configuration of the manufacturing device 700 used in each step, will be described in detail below.

First, the stacking step for stacking the members configuring the battery pack 100 will be described, with reference to FIG. 9.

FIG. 9 is a view illustrating the battery pack 100 manufacturing method according to the present embodiment and a perspective view schematically illustrating a state in which members constituting the battery pack 100 are sequentially stacked on a mounting table 710.

The mounting table 710 used for the stacking step is formed in a plate shape and is provided along a horizontal plane. The mounting table 710 comprises locating pins 711 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 711 are erected on the upper surface 710a of the mounting table 710 with predetermined intervals therebetween. The intervals between the four locating pins 711 from each other correspond, for example, to the intervals between the locating holes 152c provided on the four corners of the upper pressure plate 151. The members constituting the battery pack 100 are stacked using a robot arm, a hand lifter, a vacuum adsorption type collet, or the like The locating pins 711 are configured to provide a predetermined clearance with respect to the locating holes 121e, 122e of the spacer 120, the locating hole 151c of the upper pressure plate 151, and the locating hole 152c of the lower pressure plate 152.

In the stacking step, the lower pressure plate 152 is lowered along the stacking direction Z and mounted on the upper surface 710a of the mounting table 710, in a state in which the locating holes 152c provided on the four corners thereof are inserted into the locating pins 711 by means of a robot arm, as illustrated in FIG. 9. Next, the first cell sub-assembly 100M is lowered along the stacking direction Z and mounted on the lower pressure plate 152, in a state in which the locating holes 121e, 122e provided on the first spacer 121 and the second spacer 122, which are component members thereof, are inserted into the locating pins 711 by means of a robot arm. In the same manner, three sets each of the second cell sub-assembly 100N and the first cell sub-assembly 100M are alternately stacked by means of the robot arm. A double-sided tape 160 that is joined to a stacking member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151c provided on the four corners thereof are inserted into the locating pins 711 by means of a robot arm.

As described above, the locating pins 711 are configured to provide a predetermined clearance with respect to the locating holes 121e, 122e, 151c, 152c. Accordingly, when the stacking step is completed, variation in the positions of the plurality of the unit cells 110 and spacers 120 that are stacked in the stacking direction Z may occur on the XY plane. The spacer positioning step among the electrode tab positioning steps for positioning the electrode tabs 113 by eliminating this variation in position on the XY plane will be described below, with reference to FIGS. 10-13.

Figure 12A:
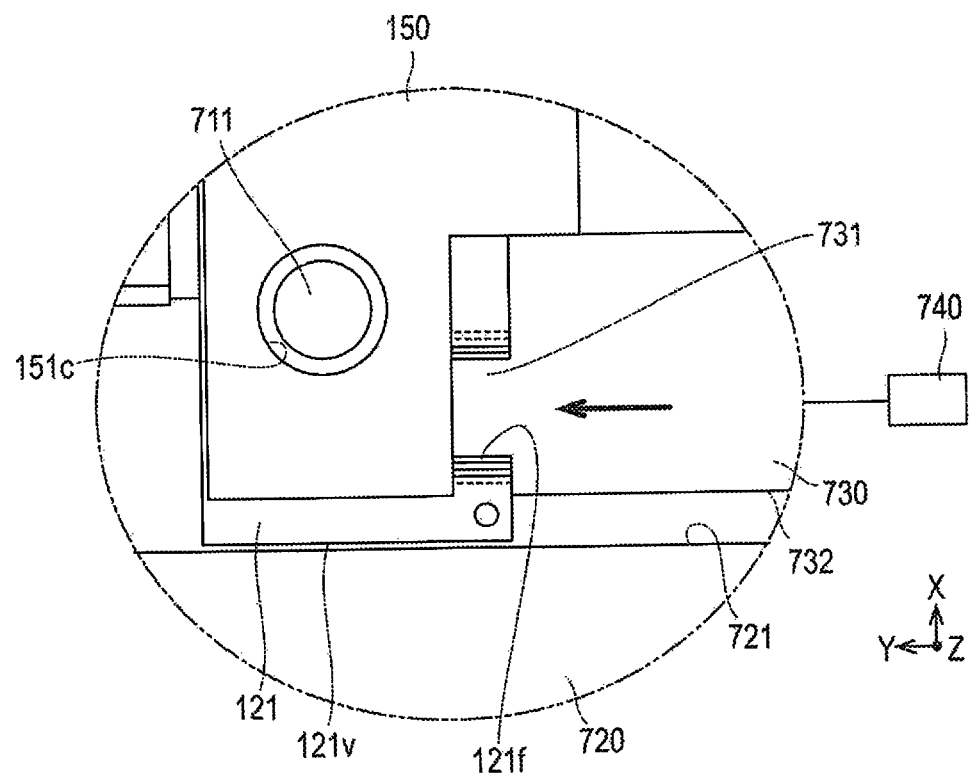
FIG. 12A is a view illustrating a state before the engagement jig in portion A of FIG. 11 is moved.
Figure 12B:
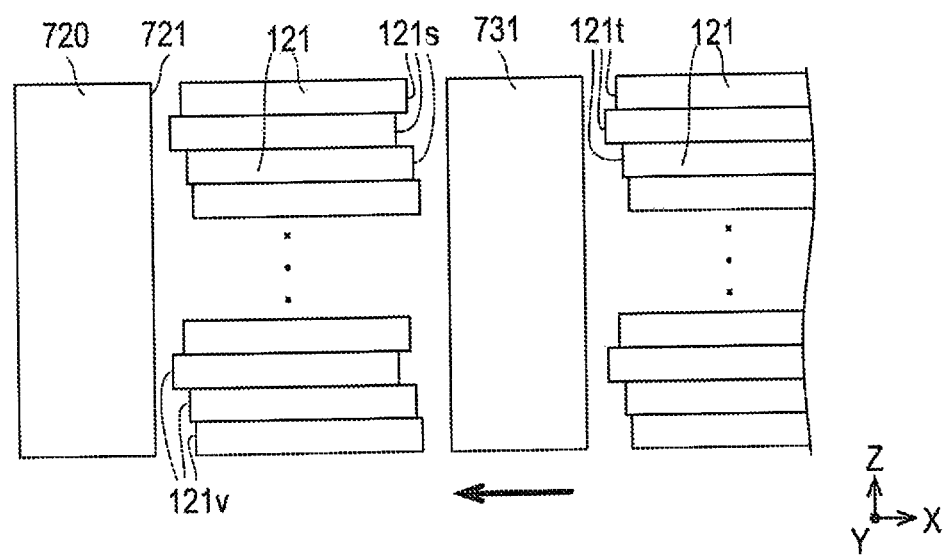
FIG. 12B is a schematic view illustrating a state before the engagement jig is moved.
Figure 13A:
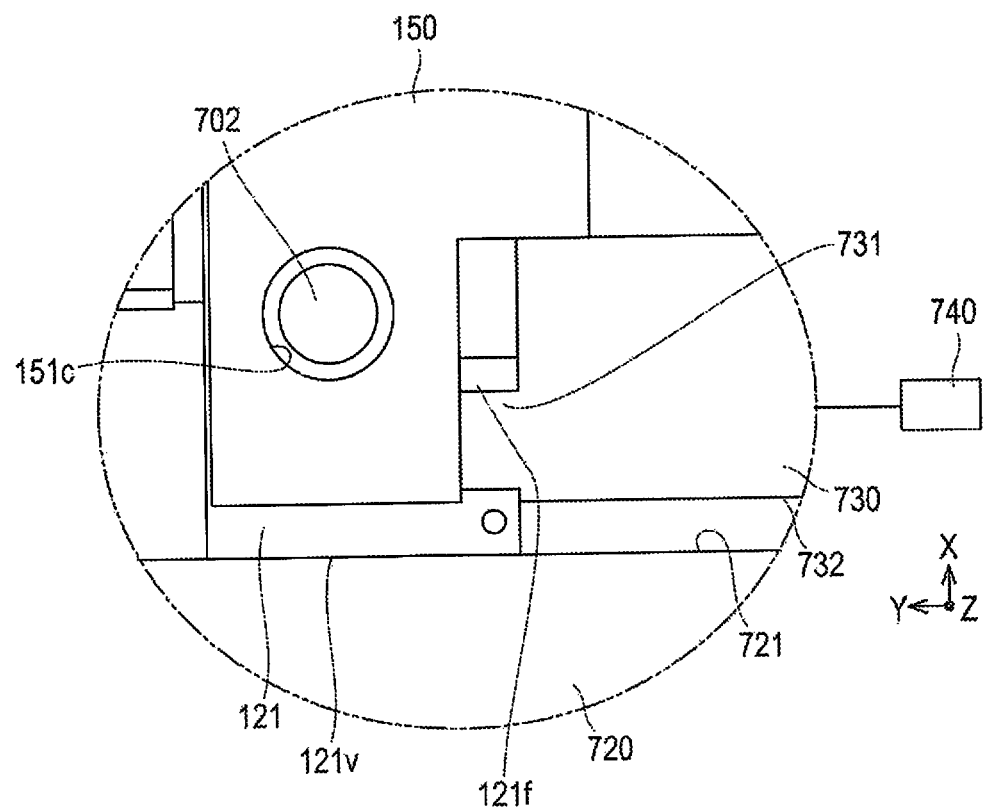
FIG. 13A is a view illustrating a state after the engagement jig in portion A of FIG. 11 is moved.
Figure 13B:
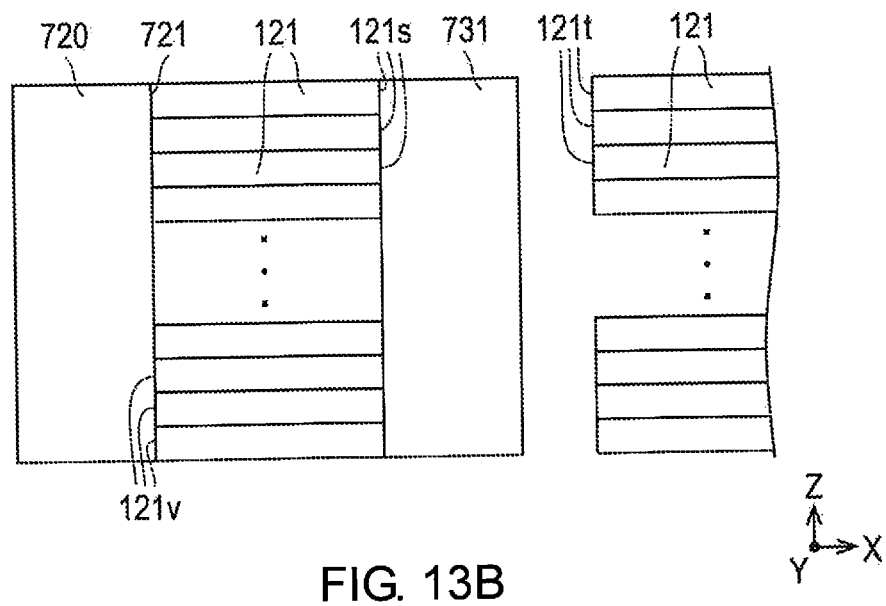
FIG. 13B is a schematic view illustrating a state after the engagement jig is moved.

FIG. 10 is a perspective view illustrating a state in which a reference jig 720 is disposed on a mounting table 710 and a protruding portion 731 of an engagement jig 730 is engaged with the recessed portions 121f of the first spacers 121. FIG. 11 is an upper surface view illustrating the state of FIG. 10. FIG. 12A is a view illustrating a state before the engagement jig 730 in portion A of FIG. 11 is moved, and FIG. 12B is a schematic view illustrating a state before the engagement jig 730 is moved. FIG. 13A is a view illustrating a state after the engagement jig 730 in portion A of FIG. 11 is moved, and FIG. 13B is a schematic view illustrating a state after the engagement jig 730 is moved.

The reference jig 720 is disposed fixed on the mounting table 710, as illustrated in FIG. 10. The method of fixing the reference jig 720 on the mounting table 710 is not particularly limited. The reference jig 720 comprises a reference surface 721 on which the extending surfaces 121v of the first spacers 121 abut when the engagement jig 730 is moved, as illustrated in FIGS. 10-12.

The engagement jig 730 is disposed so as to be adjacent to the reference jig 720 along the X direction. The engagement jig 730 is moved in the XY direction by the moving means 740. The moving means 740 carries out positioning of joining portions of the electrode tabs 113 on the bus bar 131 at predetermined positions in a movement direction of the first spacers 121 by moving the first spacers 121 to the negative side in the X direction in a state in which the unit cells 110 and the first spacers 121 are stacked. The moving means 740 is not particularly limited, and, for example, an air cylinder, an electric cylinder, or the like may be used. As described above, the engagement jig 730 comprises a protruding portion 731 that can engage with the recessed portion 121f of the first spacers 121.

A surface 732 of the engagement jig 730 adjacent to the reference jig 720 is disposed provided with a predetermined clearance with respect to the reference jig 720, in a state in which the extending surfaces 121v of the first spacers 121 are in contact with the reference surface 721 of the reference jig 720, as illustrated in FIG. 13A. By providing a surface 732 in this manner, the extending surfaces 121v of the first spacers 121 come in contact with the reference surface 721 of the reference jig 720, when the first spacers 121 are moved.

In the spacer positioning step, first, the protruding portion 731 of the engagement jig 730 is engaged with the recessed portions 121f of the first spacers 121 by the moving means 740, as illustrated in FIG. 12A. Specifically, the engagement jig 730 is moved toward the left in the Y direction in FIG. 12A by the moving means 740 (refer to the arrow in FIG. 12A). At this time, the positions of the first spacers 121 in the X direction differ along the stacking direction Z, as illustrated in FIG. 12B.

Next, the engagement jig 730 is moved toward the left in the X direction by the moving means 740, as indicated by the arrow in FIG. 12B. At this time, since the locating holes 121e of the first spacers 121 are inserted into the locating pins 711 of the mounting table 710, the range in which the first spacers 121 move is equal to or less than the clearance between the locating holes 121e and the locating pins 711. According to this configuration, rough positioning is carried out by the locating holes 121e and the locating pins 711, and precise positioning is carried out by means of the engagement jig 730. Accordingly, it is possible to reduce the time spent on the electrode tab positioning step.

As described above, by moving the engagement jig 730, the protruding portion 731 of the engagement jig 730 moves the first spacers 121 toward the reference surface 721 of the reference jig 720, in a state of being abutted on the first surfaces 121s of the recessed portions 121f. As a result, the extending surfaces 121v of the first spacers 121 come in contact with the reference surface 721 of the reference jig 720, as illustrated in FIG. 13A, (B). Accordingly, the extending surfaces 121v of the first spacers 121 along the stacking direction attain the same plane in the YZ plane. As a result, it is possible to align the joining portions of the electrode tabs 113 on the bus bar 131 along the stacking direction Z.

The pressurizing step for pressurizing the cell group 100G of the battery pack 100 will be described with reference to FIG. 14.

Figure 14:
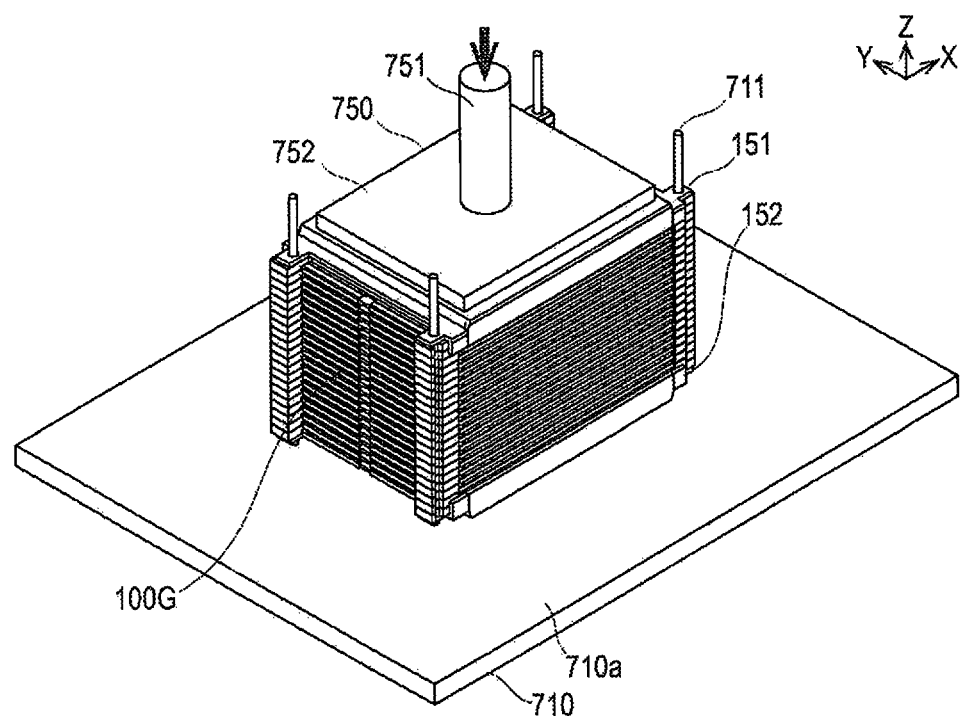
FIG. 14 is a perspective view schematically illustrating a state in which the component members of a battery pack are pressed from above, following FIG. 13.

FIG. 14 is a perspective view schematically illustrating a state in which the component members of a battery pack 100 are pressed from above, following FIG. 13.

The pressurizing jig 750 used in the pressurizing step comprises a pressurizing portion 751 that is formed in a plate shape and provided along a horizontal plane, and a supporting portion 752 that is formed in a cylindrical shape and that is erected and joined to the upper surface of the pressurizing portion 751. The supporting portion 752 connects a hydraulic cylinder and an electric stage that are driven along the stacking direction Z. The pressurizing portion 751 moves above and below along the stacking direction Z via the supporting portion 752. The pressurizing portion 751 pressurizes the abutted stacking members.

In the pressurizing step, the pressurizing portion 751 of the pressurizing jig 750 is lowered downward along the stacking direction Z while being abutted on the upper pressure plate 151 by the electric stage connected to the supporting portion 752 being driven, as illustrated in FIG. 14. The cell group 100G is sandwiched and pressurized by the upper pressure plate 151 that is pressed downward and the lower pressure plate 152 that is mounted on the mounting table 710. An appropriate surface pressure is imparted to the power generation element 111 of each of the unit cells 110 provided in the cell group 100G. The pressurizing step is continued until the next first joining step is completed.

The first joining step in which the side plates 153 are joined to the upper pressure plate 151 and the lower pressure plate 152 will be described with reference to FIG. 15.

Figure 15:
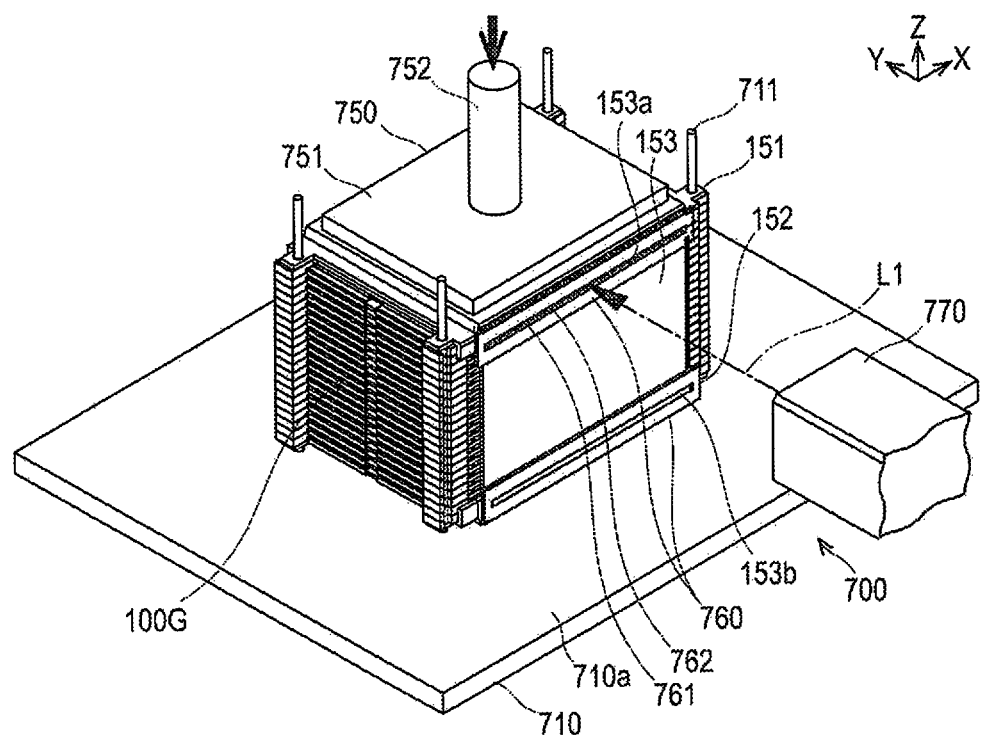
FIG. 15 is a perspective view schematically illustrating a state in which a side plate is laser-welded to an upper pressure plate and a lower pressure plate, following FIG. 14.

FIG. 15 is a perspective view schematically illustrating a state in which the side plates 153 are laser-welded to the upper pressure plate 151 and the lower pressure plate 152, following FIG. 14.

The pushing plate 760 used in the first joining step respectively presses the side plates 153 to the upper pressure plate 151 and the lower pressure plate 152, to respectively bring the side plates 153 in close contact with the upper pressure plate 151 and the lower pressure plate 152. The pushing plate 760 is made of metal and formed in an elongated plate shape. A linear slit 762 is opened in a main body 761 of the pushing plate 760 along the longitudinal direction. The short side direction of the pushing plate 760 is erected along the stacking direction Z. The pushing plate 760 presses the side plate 153 with the main body 761 and allows laser light L1 for welding to pass through the slit 762.

A laser oscillator 770 is a light source for joining the side plates 153 to the upper pressure plate 151 and the lower pressure plate 152. The laser oscillator 770 is configured from, for example, a YAG (yttrium aluminum garnet) laser. The laser light L1 that is led out from the laser oscillator 770 is irradiated onto the upper end 153a and the lower end 153b of the side plate 153, in a state in which the light path is adjusted by means of, for example, an optical fiber or a mirror, and condensed by means of a condenser lens. The laser light L1 that is led out from the laser oscillator 770 can be split by a half-mirror and irradiated onto the upper end 153a and the lower end 153b of the side plate 153 at the same time.

In the first joining step, a laser oscillator 770 horizontally scans laser light L1 onto the upper end 153a of the side plate 153 that is pressed by means of the pushing plate 760 via the slit 762 of the pushing plate 760 and subjects the side plate 153 and the upper pressure plate 151 to seam welding at a plurality of locations, as illustrated in FIG. 15. In the same manner, the laser oscillator 770 horizontally scans laser light L1 onto the lower end 153b of the side plate 153 that is pressed by means of the pushing plate 760 via the slit 762 of the pushing plate 760 and subjects the side plate 153 and the lower pressure plate 152 to seam welding at a plurality of locations.

The contact step among the electrode tab positioning steps for positioning the electrode tabs 113 with respect to the bus bar 131 will be described with reference to FIGS. 16-19.

Figure 16:
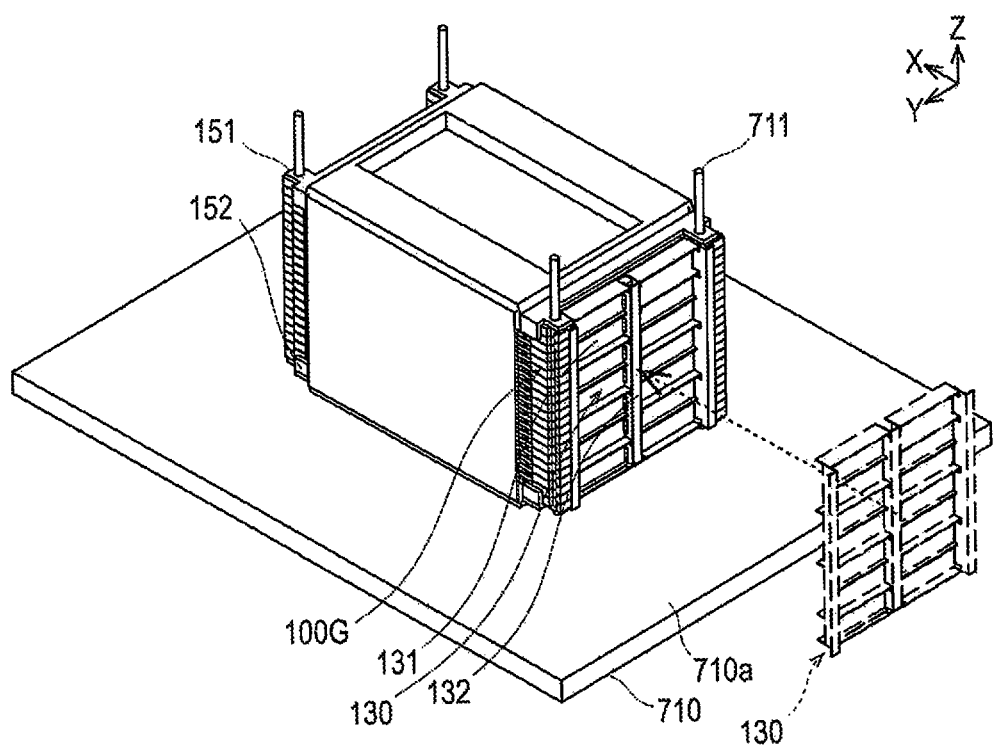
FIG. 16 is a perspective view schematically illustrating a state in which a bus bar unit is attached to the cell group, following FIG. 15.
Figure 17:
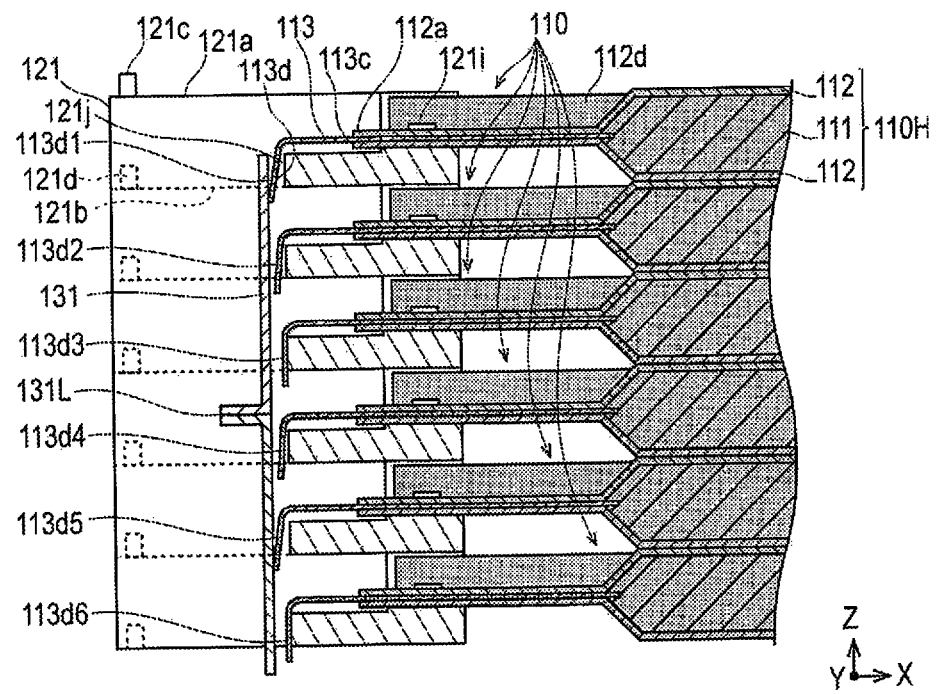
FIG. 17 is a cross-sectional view illustrating the principle part of a state in which the bus bar unit is attached to the cell group.
Figure 18:
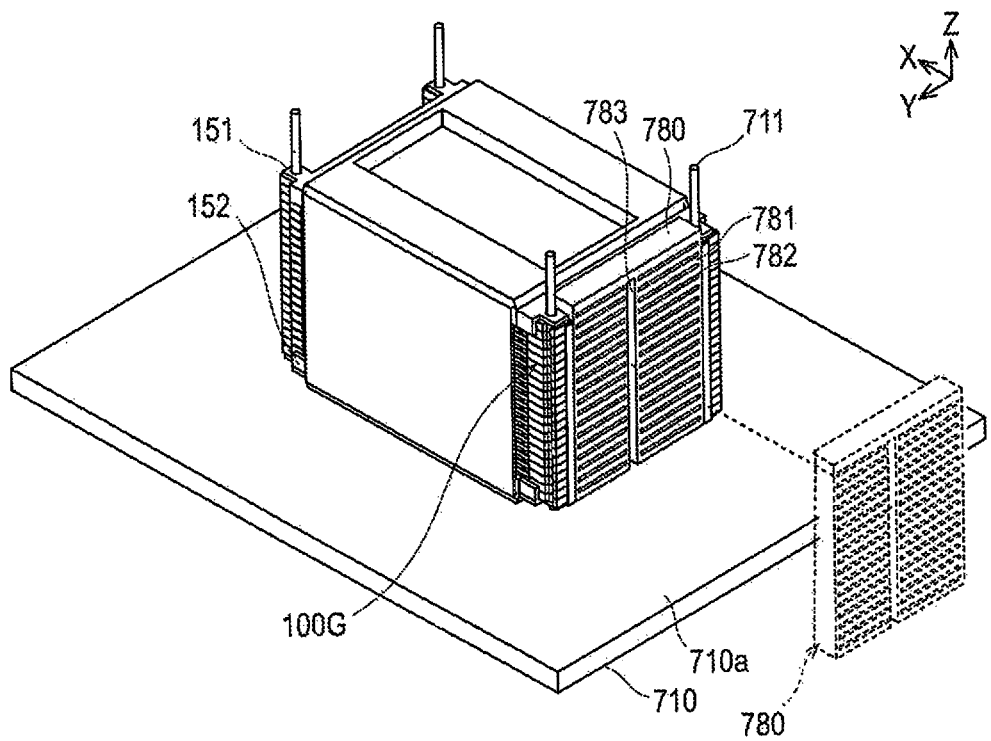
FIG. 18 is a perspective view schematically illustrating a state in which the bus bar is moved to the cell body side by means of a contact jig, following FIG. 16.
Figure 19:
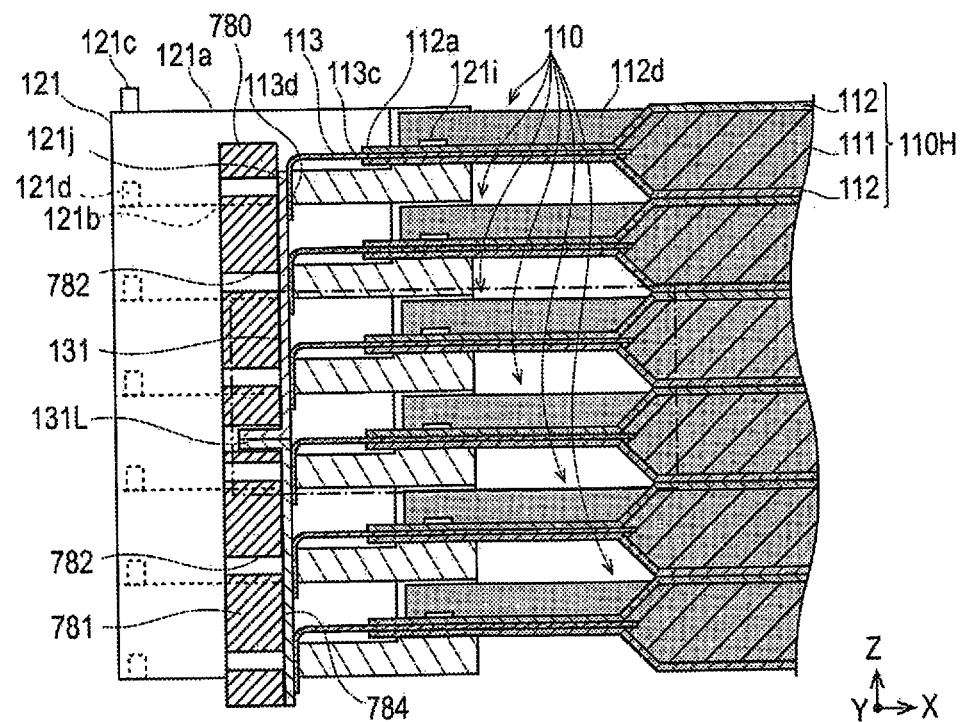
FIG. 19 is a cross-sectional view illustrating the principle part of a state in which the contact jig moves the bus bar to the cell body side, and a distal end portion of the electrode tab is brought in contact with a supporting portion of a first spacer by means of the bus bar.

FIG. 16 is a perspective view schematically illustrating a state in which the bus bar unit 130 is attached to the cell group 100G, following FIG. 15. FIG. 17 is a cross-sectional view illustrating the principle part of a state in which the bus bar unit 130 is attached to the cell group 100G. FIG. 18 is a perspective view schematically illustrating a state in which the bus bar 131 is moved to the cell body 110H side by a contact jig 780, following FIG. 16. FIG. 19 is a cross-sectional view illustrating the principle part of a state in which the contact jig 780 moves the bus bar 131 towards the cell body 110H side and the distal end portions 113d of the electrode tabs 113 are brought into contact with supporting portions 121j of the first spacers 121 by the bus bar 131.

Figure 20:
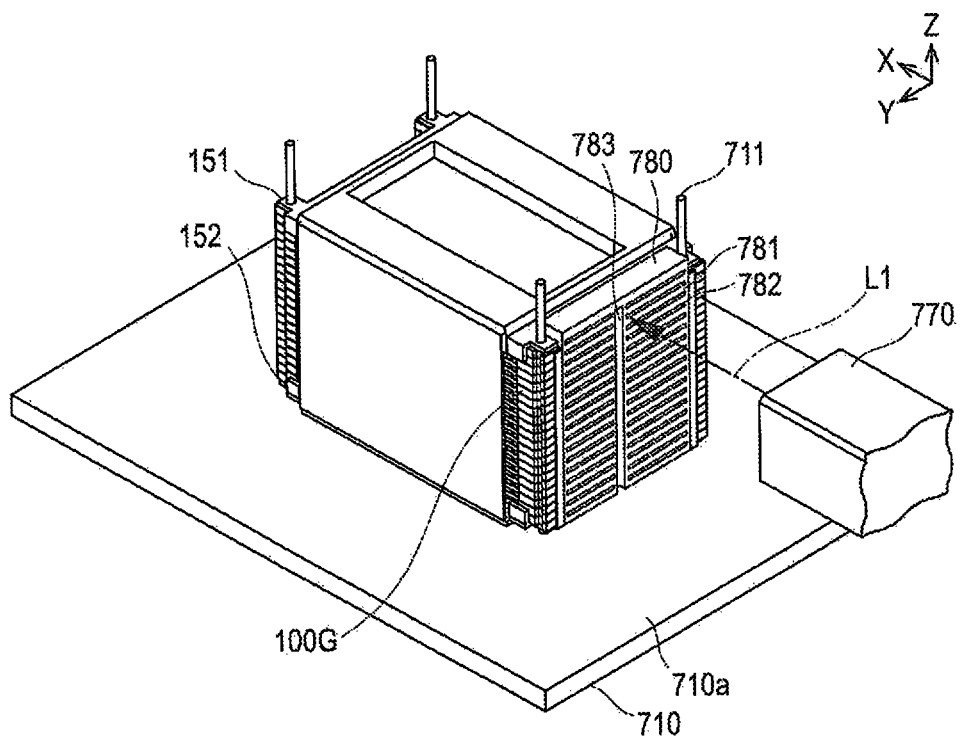
FIG. 20 is a perspective view schematically illustrating a state in which the bus bar of the bus bar unit is laser-welded to the electrode tabs of the unit cell, following FIG. 18 and FIG. 19.

The contact jig 780 used in the contact step moves the bus bar 131 to the cell body 110H side and causes the distal end portion 113d of the electrode tab 113 to come in contact with the supporting portion 121j of the first spacer 121 by means of the bus bar 131. In addition, the contact jig 780 pushes the bus bar 131 so as to surround the joining portion of the electrode tab 113 on the bus bar 131, to move the bus bar 131 to the cell body 110H side, as illustrated in FIG. 20.

The contact jig 780 comprises a main body 781, a first opening 782 that is opened linearly along the Y direction, a second opening 783 that is opened linearly along the Z direction, and a pressing surface 784 that presses the bus bar 131, as illustrated in FIGS. 17, 19-21.

Figure 21:
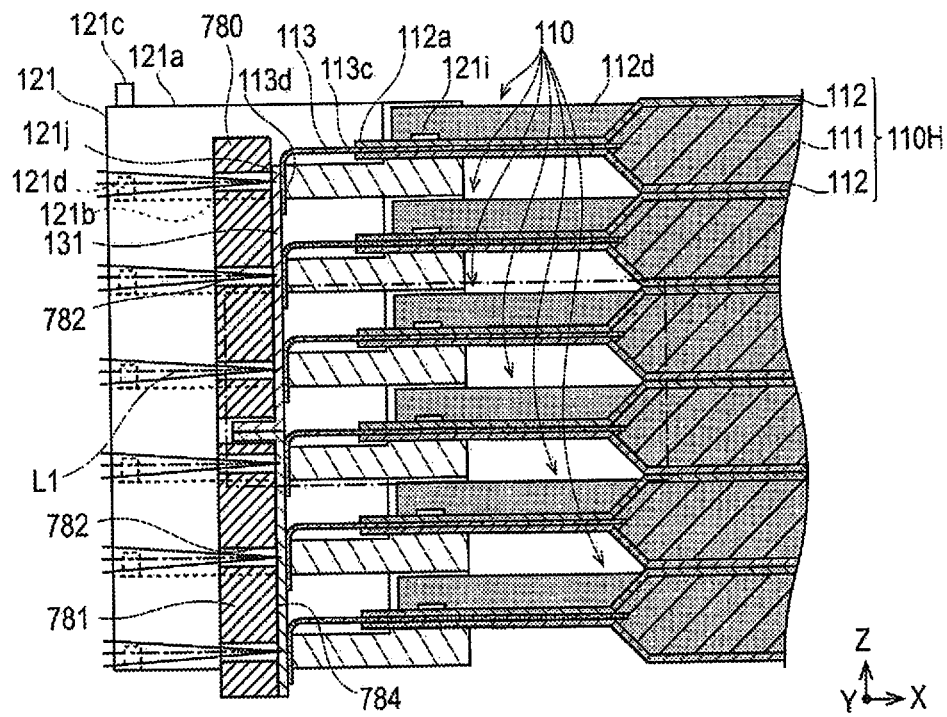
FIG. 21 is a side view illustrating a cross-section of the principle part of a state in which the bus bar is laser-welded to the electrode tabs of the stacked unit cells.

The first opening 782 is formed so as to pass through laser light L1 as well as the folded portion 131L of the bus bar 131 (refer to FIG. 21). In addition, the second opening 783 is formed so as to pass through the auxiliary columnar support portion 132b of the bus bar holder 132 (refer to FIG. 4).

The pressing surface 784 is formed so as to surround the joining portion of the electrode tab 113 with respect to the bus bar 131. Accordingly, it is possible to suitably move the bus bar 131 to the cell body 110H side across the entire length along the Y direction of the joining portion of the electrode tab 113 with respect to the bus bar 131.

In addition, the pressing surface 784 is formed so as to be capable of pressing the entire bus bar 131 attached to the bus bar holder 132. Therefore, since it is possible to uniformly move the bus bar 131 attached to the bus bar holder 132 to the cell body 110H side, operation is facilitated.

In the contact step, the mounting table 710 rotates 90 degrees counterclockwise in the drawing to cause the electrode tabs 113 of the cell group 100G and the laser oscillator 770 to face each other, as illustrated in FIG. 15 to FIG. 16. Then, the bus bar holder 132, by which the bus bars 131 are integrally held, is abutted on the corresponding electrode tabs 113 of the cell group 100G by means of a robot arm (not shown).

At this time, it is necessary for the X direction position of the distal end portion 113d of each electrode tab 113 to be relatively displaced in the Z direction, as illustrated in FIG. 17. Of the six electrode tabs 113 illustrated in FIG. 17, the distal end portions 113d3, 113d6 of the third and sixth electrode tabs 113 from the top are in contact with the supporting portion 121j of the corresponding first spacer 121. On the other hand, of the six electrode tabs 113 illustrated in FIG. 17, the distal end portions 113d1, 113d2, 113d4, 113d5 of the first, second, fourth, and fifth electrode tabs 113 from the top are positioned away from the supporting portion 121j of the respective corresponding first spacer 121. The relationship between the distal end portion 113d of the electrode tab 113 and the supporting portion 121j of the first spacer 121 described above is merely one example, and other combinations are possible. Since the first spacers 121 are positioned in the spacer positioning step described above, the X direction positions are matched along the Z direction, as illustrated in FIG. 17.

After the bus bar holder 132 is brought in contact with the electrode tab 113, the bus bar 131 is moved to the cell body 110H side (toward the right in the X direction in FIG. 19) by means of the contact jig 780, as illustrated in FIG. 18 and FIG. 19. As a result, the distal end portion 113d of each electrode tab 113 is brought in contact with the supporting portion 121j of each corresponding first spacer 121 by means of the bus bar 131. Of the six electrode tabs 113 illustrated in FIG. 19, the proximal end portion 113c of the first, second, fourth, and fifth electrode tab 113 from the top are slightly curved while moving to the cell body 110H side.

Through this contact step, the distal end portions 113d of all of the electrode tabs 113 are brought in contact with the supporting portions 121j of the corresponding first spacers 121, and it becomes possible to carry out positioning of the joining portion of the electrode tab 113 on the bus bar 131 at a predetermined position, as illustrated in FIG. 19.

The second joining step in which the bus bar 131 is joined to the electrode tabs 113 of the unit cell 110 and the terminal is joined to the bus bar 131 will be described with reference to FIGS. 20-22.

FIG. 20 is a perspective view schematically illustrating a state in which the bus bar 131 of the bus bar unit 130 is laser-welded to the electrode tabs 113 of the unit cell 110, following FIG. 18 and FIG. 19. FIG. 21 is a side view illustrating a cross-section of the principle part of a state in which the bus bar 131 is laser-welded to the electrode tabs 113 of the stack of the unit cells 110. FIG. 22 is a perspective view schematically illustrating a state in which an anode side terminal 133 and a cathode side terminal 134 are laser-welded to an anode side bus bar 131A and a cathode side bus bar 131K, following FIG. 20 and FIG. 21.

In the second joining step, the laser oscillator 770 irradiates the laser light L1 onto the bus bar 131 via the first opening 782 and joins the bus bar 131 and the distal end portions 113d of the electrode tabs 113 by seam welding or spot welding, as illustrated in FIG. 20 and FIG. 21. At this time, the distal end portions 113d of the electrode tabs 113 are sandwiched between the supporting portion 121j of the first spacer 121 and the bus bar 131, in a region excluding the joining portion of the electrode tab 113, as illustrated in FIG. 21. Accordingly, it is possible to carry out laser welding while eliminating the gap between the bus bar 131 and the distal end portion 113d of the electrode tab 113 as much as possible, thereby improving the joining quality. In addition, the X direction positions of the distal end portions 113d of the electrode tabs 113 are positioned across the Z direction, as illustrated in FIG. 21. That is, since the joining portions of the electrode tabs 113 with respect to the bus bar 131 have been positioned at predetermined positions, the joining quality is improved. Then, the contact jig 780 is removed, and the anode side terminal 133 is joined to the anode side bus bar 131A corresponding to the anode side terminal end (upper right in FIG. 4), from among the bus bars 131 arranged in a matrix, as illustrated in FIG. 22. In the same manner, the cathode side terminal 134 is joined to the cathode side bus bar 131K corresponding to the cathode side terminal end (lower left in FIG. 4), from among the bus bars 131 arranged in a matrix.

The mounting step in which a protective cover 140 is attached to the bus bar 131 will be described, with reference to FIG. 23.

Figure 22:
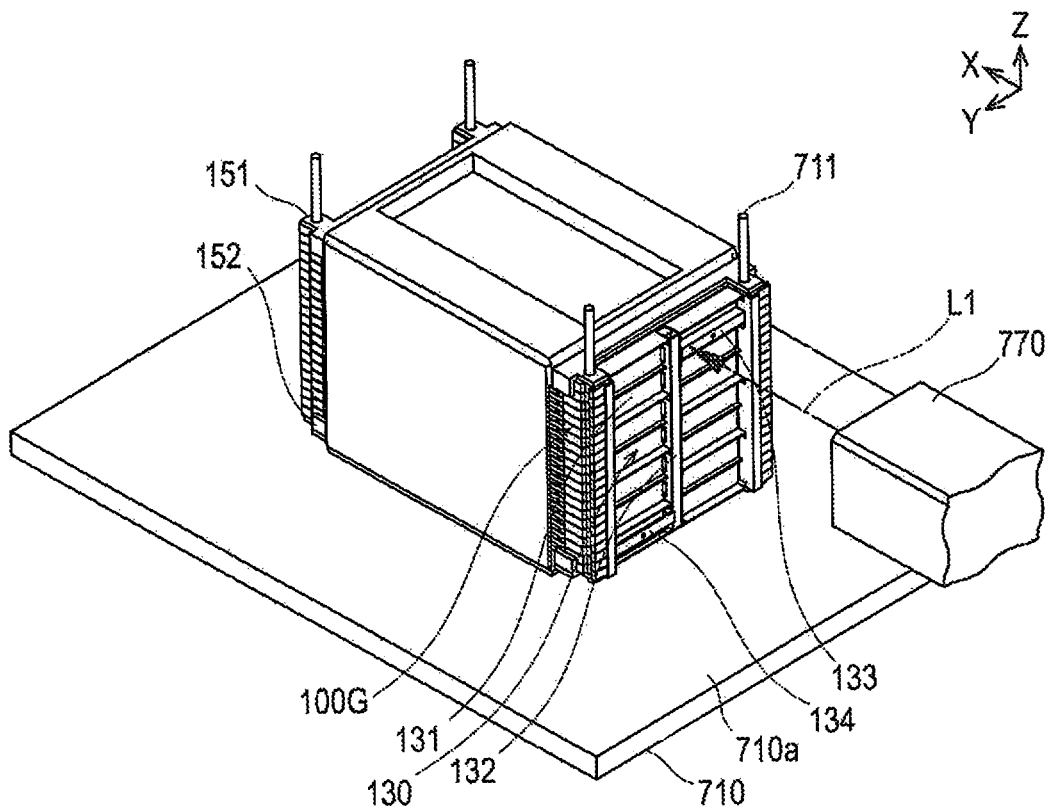
FIG. 22 is a perspective view schematically illustrating a state in which an anode side terminal and a cathode side terminal are laser-welded to an anode side bus bar and a cathode side bus bar, following FIG. 20 and FIG. 21.
Figure 23:
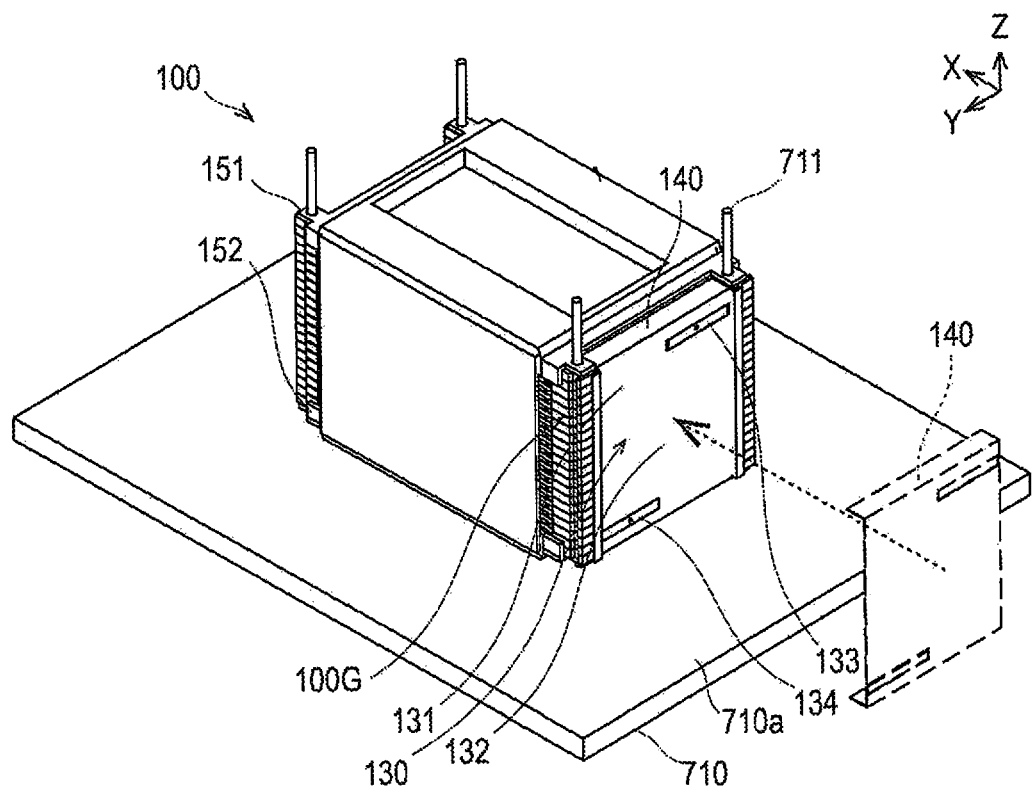
FIG. 23 is a perspective view schematically illustrating a state in which a protective cover is attached to the bus bar unit, following FIG. 22.

FIG. 23 is a perspective view schematically illustrating a state in which a protective cover 140 is attached to the bus bar unit 130, following FIG. 22.

In the mounting step, a protective cover 140 is attached to the bus bar unit 130 while fitting the upper end 140b and the lower end 140c of the protective cover 140 on the bus bar unit 130, using the robot arm. The upper end 140b and the lower end 140c of the protective cover 140 may be joined to the bus bar unit 130 by an adhesive. The protective cover 140 exposes the anode side terminal 133 to the outside from the first opening 140d and exposes the cathode side terminal 134 from the second opening 140e to the outside. The protective cover 140 covers the bus bar unit 130 to prevent the bus bars 131 from short-circuiting with each other and from coming in contact with an external member and being short-circuited or causing electrical leakage. When manufacture is completed, the battery pack 100 is removed from the mounting table 710 and carried out to an inspection step for inspecting the battery performance, and the like.

The manufacturing method of the battery pack 100 described with reference to FIGS. 9-23 may be embodied by an automatic machine in which all of the steps are controlled by a controller, a semiautomatic machine in which a portion of the steps are carried out by a worker, or a manual machine in which all of the steps are carried out by a worker.

As described above, the manufacturing method of a battery pack 100 according to the present embodiment is a manufacturing method of a battery pack 100 comprising a cell group 100G and a bus bar 131. The manufacturing method of a battery pack 100 comprises an electrode tab positioning step for positioning a joining portion of the electrode tab 113 on the bus bar 131 at a predetermined position, in a movement direction of the first spacer 121, by moving the first spacer 121 in one direction in a state in which the unit cells 110 and the first spacer 121 are stacked, before the bus bar 131 is joined to the electrode tab 113. In addition, the manufacturing method of a battery pack 100 comprises a joining step for joining the bus bar 131 to the electrode tab 113, in a state in which the joining portion of the electrode tab 113 is positioned at a predetermined position. According to this manufacturing method, the bus bar 131 is joined to the electrode tab 113 in a state in which the joining portion of the electrode tab 113 on the bus bar 131 has been positioned. Therefore, it is possible to align the distances from the arranging position of the laser oscillator 770 to the electrode tabs 113 along the stacking direction Z with high precision. Therefore, it is possible to suitably join the electrode tabs 113 and the bus bar 131 when carrying out laser welding.

Additionally, the distal end portion 113d of the electrode tab 113 is bent along the stacking direction Z of the unit cells 110. In the electrode tab positioning step, in terms of the first spacer 121, the first spacer 121 is moved in a planar direction of the unit cells 110 in a direction away from the unit cells 110 (negative side in the X direction). According to this manufacturing method, since the first spacer 121 is moved away from the unit cells 110, it is possible to easily position the electrode tabs 113.

In addition, in the electrode tab positioning step, after moving the first spacer 121, the bus bar 131 is moved to the cell body 110H side, and the bus bar 131 causes the distal end portion 113d of the electrode tab 113 to come in contact with the supporting portion 121j of the first spacer 121. Additionally, in the joining step, the bus bar 131 is laser-welded at the joining portion of the electrode tab 113, in a state in which the distal end portions 113d of the electrode tabs 113 are sandwiched between the supporting portion 121j of the first spacer 121 and the bus bar 131, in a region excluding the joining portion of the electrode tab 113. Accordingly, the distal end portions 113d of all the electrode tabs 113 are brought in contact with the supporting portions 121j of the corresponding first spacers 121, and it becomes possible to suitably carry out positioning of the joining portion of the electrode tab 113 to the bus bar 131 at a predetermined position. In addition, it is possible to carry out laser welding while eliminating the gap between the bus bar 131 and the distal end portion 113d of the electrode tab 113 as much as possible, thereby improving the joining quality.

Additionally, the bus bar 131 is pushed so as to surround the joining portion, in order to move the bus bar 131 to the cell body 110H side, in the electrode tab positioning step. Accordingly, it is possible to suitably move the bus bar 131 to the cell body 110H side across the entire length along the Y direction of the joining portion of the electrode tab 113 with respect to the bus bar 131.

In addition, when moving the first spacer 121, the first spacer 121 is abutted on the reference surface 721, which serves as a reference, to position the electrode tabs 113.

According to this manufacturing method, since the electrode tabs 113 can be positioned by abutting the first spacer 121 on the reference surface 721, it becomes possible to easily position the electrode tabs 113. Therefore, the manufacturing method becomes easy.

In addition, the first spacer 121 is moved by moving the engagement jig 730, in a state in which the protruding portion 731 provided on the engagement jig 730 is engaged with the recessed portion 121f provided on the first spacer 121. According to this manufacturing method, each of the extending surfaces 121v can be easily made flush with the other.

Additionally, a first spacer 121 equipped with locating holes 121e along the stacking direction Z is stacked on a mounting table 710 provided with locating pins 711 extending in the stacking direction such that the locating pins 711 are inserted into the locating holes 121e before moving the first spacer 121. Then, the range in which the first spacer 121 moves is equal to or less than the clearance between the locating holes 121e and the locating pins 711. According to this manufacturing method, rough positioning is carried out by means of the locating holes 121e and the locating pins 711, and precise positioning is carried out by means of the engagement jig 730. Accordingly, it is possible to reduce the time spent in the electrode tab positioning step.

In addition, as described above, the manufacturing device 700 for a battery pack 100 according to the present embodiment is a manufacturing device 700 for a battery pack 100 comprising a cell group 100G and a bus bar 131. The manufacturing device 700 for a battery pack 100 comprises a moving means 740 for positioning a joining portion of the electrode tab 113 to the bus bar 131 at a predetermined position, in a movement direction of the first spacer 121, by moving the first spacer 121 in one direction in a state in which the unit cells 110 and the first spacer 121 are stacked. In addition, the manufacturing device 700 for a battery pack 100 comprises a laser oscillator 770 for joining the bus bar 131 to the electrode tab 113, in a state in which the joining portion of the electrode tab 113 is positioned at a predetermined position. According to this manufacturing device 700, the bus bar 131 is joined to the electrode tab 113 in a state in which the joining portion of the electrode tab 113 to the bus bar 131 has been positioned. Therefore, it is possible to align the distances from the arranging position of the laser oscillator 770 to the electrode tabs 113 along the stacking direction Z with high precision. Therefore, it is possible to suitably join the electrode tabs 113 and the bus bar 131 when carrying out laser welding.

Additionally, the distal end portion 113d of the electrode tab 113 is bent along the stacking direction Z of the unit cells 110. In terms of the first spacer 121, the moving means 740 moves the first spacer 121 in a planar direction of the unit cells 110 in a direction away from the unit cells 110 (negative side in the X direction). According to this manufacturing device 700, since the first spacer 121 is moved away from the unit cells 110, it is possible to easily position the electrode tabs 113.

In addition, the manufacturing device 700 further comprises a contact jig 780 that brings the distal end portion 113d of the electrode tab 113 in contact with the supporting portion 121j of the first spacer 121 by the bus bar 131, by moving the bus bar 131 to the cell body 110H side. Accordingly, the distal end portions 113d of all the electrode tabs 113 are brought in contact with the supporting portions 121j of the corresponding first spacers 121, and it becomes possible to suitably carry out positioning of the joining portion of the electrode tab 113 on the bus bar 131 at a predetermined position.

In addition, the contact jig 780 pushes the bus bar 131 so as to surround the joining portion to move the bus bar 131 to the cell body 110H side. Accordingly, it is possible to suitably move the bus bar 131 to the cell body 110H side across the entire length along the Y direction of the joining portion of the electrode tab 113 with respect to the bus bar 131.

Additionally, the manufacturing device 700 further comprises a reference jig 720 provided with a reference surface 721, which carries out positioning of each electrode tab 113 by each of the first spacers 121 being abutted thereon. According to this manufacturing device 700, since the electrode tabs 113 can be positioned by abutting the first spacer 121 on the reference surface 721, it becomes possible to easily position the electrode tabs 113. Therefore, the manufacturing method becomes easy.

In addition, the manufacturing device 700 further comprises an engagement jig 730 provided with a protruding portion 731 that can engage with a recessed portion 121f provided on the spacer 120. According to this manufacturing device 700, each of the extending surfaces 121v can be easily made flush with the other.

Additionally, the manufacturing device 700 further comprises a mounting table 710 provided with locating pins 711 that are inserted into locating holes 121e provided on the first spacer 121 along the stacking direction Z. Then, the range in which the spacer 120 moves is equal to or less than the clearance between the locating holes 121e and the locating pins 711. According to this manufacturing device 700, rough positioning is carried out by means of the locating holes 121e and the locating pins 711, and precise positioning is carried out by means of the engagement jig 730. Accordingly, it is possible to reduce the time spent on the electrode tab positioning step.

Other than the foregoing, various modifications to the present invention based on the configurations described in the Claims are possible that also belong in the scope of the present invention.

For example, in the embodiment described above, the first spacer 121 is moved by moving the engagement jig 730, in a state in which the protruding portion 731 of the engagement jig 730 is engaged with the recessed portion 121f of the first spacer 121. However, no limitation is imposed thereby; a recessed portion may be provided on the engagement jig and a protruding portion may be provided on the first spacer so as to be engaged with each other.

In addition, in the embodiment described above, the first spacer 121 is moved by means of the engagement jig 730 and the moving means 740. However, the first spacer 121 may be held and moved by a hand robot.

Additionally, in the embodiment described above, each extending surface 121v is made flush with the other by abutting the extending surface 121v of the first spacer 121 on the reference surface 721 of the reference jig 720. However, each extending surface 121v may be made flush with the other by means of the engagement jig 730 and the moving means 740 without providing a reference jig 720. At this time, the laser oscillator 770 is preferably adjusted appropriately such that the focal point of the laser light will be in an appropriate location.

Additionally, in the embodiment described above, the contact jig 780 moves the bus bar 131 to the cell body 110H side, and the bus bar 131 is joined to the distal end portion 113d of the electrode tab 113 in a state in which the distal end portion 113d of the electrode tab 113 is in contact with the supporting portion 121j of the first spacer 121. However, the contact jig 780 may move the bus bar 131 to the cell body 110H side and cause the distal end portion 113d of the electrode tab 113 to come in contact with the supporting portion 121j of the first spacer 121. Then, the distal end portion 113d of the electrode tab 113 may be plastically deformed so as to come in contact with the supporting portion 121j of the first spacer 121, after which the contact jig 780 may be removed to join the bus bar 131 to the distal end portion 113d of the electrode tab 113.

The invention claimed is:

1. A battery pack manufacturing method of a battery pack including a cell group obtained by stacking unit cells in a stacking direction, each of the unit cells having a cell body, an electrode tab and a spacer, each of the cell bodies including a power generation element and having a flat shape, and the electrode tabs protruding out from the cell bodies, and the spacers supporting the electrode tabs, and the battery pack including a bus bar joined to the electrode tabs to electrically connects the electrode tabs, the battery pack manufacturing method comprising:
an electrode tab positioning step for positioning joining portions of the electrode tabs to the bus bar at predetermined positions in a movement direction of the spacers by moving the spacers in one direction in a state in which the unit cells and the spacers are stacked, before the bus bar is joined to the electrode tabs; and
a joining step for joining the bus bar to the electrode tabs in a state in which the joining portions of the electrode tabs are positioned at the predetermined positions, wherein:
a distal end portion of the electrode tab is bent along the stacking direction of the unit cells,
in the electrode tab positioning step, the spacers are moved in a planar direction of the unit cells in a direction away from the unit cells and, after moving the spacers, the bus bar is moved towards the cell bodies, and the bus bar causes the distal end portions of the electrode tabs to come in contact with the spacers, and
in the joining step, the bus bar is laser-welded to the joining portion of the electrode tabs, in a state in which the electrode tabs are sandwiched between the spacers and the bus bar in a region excluding the joining portions of the electrode tabs.

2. The battery pack manufacturing method according to claim 1, wherein
in the electrode tab positioning step, the bus bar is pushed so as to surround the joining portions to move the bus bar towards the cell bodies.

3. The battery pack manufacturing method according to claim 1, wherein
when moving the spacers, the spacers are brought in contact with a reference surface that serves as a reference to carry out positioning of the electrode tabs.

4. The battery pack manufacturing method according to claim 1, wherein
the spacers are moved by moving an engagement jig, in a state in which a protruding portion provided on the engagement jig is engaged with recessed portions provided on the spacers.

5. The battery pack manufacturing method according to claim 1, wherein
before moving the spacers, the spacers provided with locating holes along the stacking direction of the unit cells are stacked on a mounting table provided with locating pins extending in the stacking direction such that the locating pins are inserted into the locating holes, and
the spacers are moved in a range that is equal to or less than a clearance between the locating holes and the locating pins.

6. A battery pack manufacturing device for a battery pack including a cell group obtained by stacking unit cells in a stacking direction, each of the unit cells having a cell body, an electrode tab and a spacer, each of the cell bodies including a power generation element and having a flat shape, and the electrode tabs protruding out from the cell bodies, and the spacers supporting the electrode tabs, and the battery pack including a bus bar joined to the electrode tabs to electrically connects the electrode tabs, the battery pack manufacturing device comprising:
moving means for positioning joining portion of the electrode tabs on the bus bar at predetermined positions in a movement direction of the spacers by moving the spacers in one direction in a state in which the unit cells and the spacers are stacked,
a contact jig for moving the bus bar towards the cell bodies, and
joining means for joining the bus bar to the electrode tabs in a state in which the joining portions of the electrode tabs are positioned at predetermined positions, wherein:
distal end portions of the electrode tabs are bent along the stacking direction of the unit cells,
the moving means moves the spacers in a planar direction of the unit cells in a direction away from the unit cells, and
the contact jig moves the bus bar towards the cell bodies such that the distal end portions of the electrode tabs are brought in contact with the spacers by the bus bar.

7. The battery pack manufacturing device according to claim 6, wherein
the contact jig pushes the bus bar so as to surround the joining portions to move the bus bar towards the cell bodies.

8. The battery pack manufacturing device according to claim 6, further comprising
a reference jig provided with a reference surface, which carries out positioning of each of the electrode tabs by each of the spacers being abutted thereon.

9. The battery pack manufacturing device according to claim 6, further comprising
an engagement jig provided with a protruding portion that engages with recessed portions provided on the spacers.

10. The battery pack manufacturing device according to claim 6, further comprising
a mounting table provided with locating pins that are inserted into locating holes provided on the spacers along the stacking direction of the unit cells,
the spacers are movably arranged in a range that is equal to or less than a clearance between the locating holes and the locating pins.

11. The battery pack manufacturing method according to claim 1, wherein
the electrode tab positioning step comprises moving the spacers in the one direction such that distal ends of each of the electrode tabs are aligned along the stacking direction.

12. The battery pack manufacturing device according to claim 6, wherein the moving means is configured to move the spacers in the one direction such that distal ends of each of the electrode tabs are aligned along the stacking direction.

13. A battery pack manufacturing method of a battery pack including a cell group obtained by stacking unit cells in a stacking direction, each of the unit cells having a cell body, an electrode tab and a spacer, each of the cell bodies including a power generation element and having a flat shape, and the electrode tabs protruding out from the cell bodies, and the spacers supporting the electrode tabs, and the battery pack including a bus bar joined to the electrode tabs to electrically connects the electrode tabs, the battery pack manufacturing method comprising:

an electrode tab positioning step for positioning joining portions of the electrode tabs to the bus bar at predetermined positions in a movement direction of the spacers by moving the spacers in one direction in a state in which the unit cells and the spacers are stacked, before the bus bar is joined to the electrode tabs; and a joining step for joining the bus bar to the electrode tabs in a state in which the joining portions of the electrode tabs are positioned at the predetermined positions, wherein the electrode tab positioning step comprises moving the spacers in the one direction such that distal ends of each of the electrode tabs are aligned along the stacking direction before joining the bus bar to the electrode tabs.

* * * * *